United States Patent
Al Hamouz et al.

(10) Patent No.: US 10,364,164 B2
(45) Date of Patent: *Jul. 30, 2019

(54) CROSS-LINKED POLYMERIC RESIN AND METHODS FOR WASTEWATER TREATMENT

(71) Applicant: KING FAHD UNIVERSITY OF PETROLEUM AND MINERALS, Dhahran (SA)

(72) Inventors: Othman Charles Sadeq Al Hamouz, Dhahran (SA); Oluwafemi S. Akintola, Burnaby (CA); Tawfik Abdo Saleh Awadh, Dharan (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 228 days.

This patent is subject to a terminal disclaimer.

(21) Appl. No.: 15/238,293

(22) Filed: Aug. 16, 2016

(65) Prior Publication Data
US 2017/0158528 A1    Jun. 8, 2017

Related U.S. Application Data

(60) Provisional application No. 62/263,116, filed on Dec. 4, 2015.

(51) Int. Cl.
*B01J 20/26* (2006.01)
*B01J 20/28* (2006.01)
(Continued)

(52) U.S. Cl.
CPC ............. *C02F 1/285* (2013.01); *B01J 20/267* (2013.01); *B01J 20/28014* (2013.01);
(Continued)

(58) Field of Classification Search
CPC ...... B01J 20/267; B01J 20/3425; C02F 1/285; C02F 2101/20; C02F 2303/16;
(Continued)

(56) References Cited

U.S. PATENT DOCUMENTS 3,847,995 A * 11/1974 Walker ..................... B01J 20/22
568/492
5,164,095 A * 11/1992 Sparapany ............ C02F 1/5272
210/735

(Continued)

FOREIGN PATENT DOCUMENTS

DE           2255504    * 11/1993
JP       56-79129 A       6/1981

OTHER PUBLICATIONS

Pub. FR002189455; Document identifier: FR2189455 A1, Jan. 25, 1974 (Abstract).*

(Continued)

*Primary Examiner* — Ana M Fortuna
(74) *Attorney, Agent, or Firm* — Oblon, McClelland, Maier & Neustadt, L.L.P.

(57) ABSTRACT

Cross-linked polymeric resins from anilines linked together with polyamine alkyl chains. A process for producing the cross-linked polymeric resins by Mannich-type polycondensation of anilines and diaminoalkanes linked together by an aldehyde and subsequent basification. In addition, a method for removing heavy metals, such as Pb (II) and As (V) from aqueous solution via contacting and treatment with the cross-linked polymeric resins.

4 Claims, 20 Drawing Sheets

(51) Int. Cl.
*B01J 20/34* (2006.01)
*C08G 73/02* (2006.01)
*C02F 1/28* (2006.01)
*C02F 101/10* (2006.01)
*C02F 101/20* (2006.01)
*C02F 103/34* (2006.01)

(52) U.S. Cl.
CPC ..... *B01J 20/28059* (2013.01); *B01J 20/3425* (2013.01); *C08G 73/0266* (2013.01); *C02F 2101/103* (2013.01); *C02F 2101/20* (2013.01); *C02F 2103/34* (2013.01); *C02F 2303/16* (2013.01)

(58) Field of Classification Search
CPC ................ C08G 73/0266; C08G 59/28; C08G 59/4042; C08G 18/4854; C08G 75/00; C08K 5/17; C08K 5/315; C08K 5/0025; C08K 3/06; C08K 5/51; C08K 5/521; C08K 9/04; C08J 2321/00; C08J 5/06; C08J 2359/02; C08J 7/047; C08J 7/14
See application file for complete search history.

(56) References Cited

U.S. PATENT DOCUMENTS 5,200,475 A * 4/1993 Dewhirst ............... C08G 59/50
525/481
5,700,942 A * 12/1997 McAteer ............. C07D 215/06
546/152
6,627,086 B2 * 9/2003 Mahoney ................. C02F 1/56
134/38
2010/0286035 A1 11/2010 Ohtaki et al.
2017/0158528 A1 * 6/2017 Al Hamouz ............ C02F 1/285

OTHER PUBLICATIONS

Pub. No. DE002323936 A1, Document indentifier: DE 2323936 A1, Dec. 6, 1973 (abstract).*
Lanning, D., J., et al., "Chaperone-like N-methyl Peptide Inhibitors of Polyglutamine Aggregation", Biochemistry, vol. 49, No. 33, pp. 1-25, (Aug. 24, 2010).
Bohme, F., et al., "Multifunctional coupling agents. Part 4: Block copolymers based on amino terminated polyamide-12 and carboxy terminated poly(butylene terephthalate)", Polymer Degradation and Stability, Total 2 pages, vol. 92, Issue 12, (Dec. 2007).
Fader, L.D., et al., "Synthesis of novel analogs of aromatic peptide nucleic acids (APNAs) with modified conformational and electrostatic properties", Tetrahedron, vol. 60, Issue 10, Total 3 Pages, (Mar. 2004).
Fader, L.D., et al., "Backbone Modifications of Aromatic Peptide Nucleic Acid (APNA) Monomers and Their Hybridization Properties with DNA and RNA", Journal of Organic Chemistry, vol. 66 (10), Total 2 pages, (2001).
Ueda, M., et al., "Synthesis of polyamides by ring-opening polyaddition of bis-3,1-benzoxazin-4-ones with aliphatic diamines", Journal of Polymer Science: Polymer Chemistry Edition, vol. 17, Issue 4, Total 2 Pages, (Apr. 1979).
Beam, C.F. et al., "Synthesis of monomers and copolymers from isatoic anhydrides", Journal of Polymer Science, Polymer Chemistry Edition, vol. 16 (10), pp. 2679-2681, (1978).

* cited by examiner

CROSS-LINKED POLYMERIC RESIN AND METHODS FOR WASTEWATER TREATMENT

CROSS REFERENCE TO RELATED APPLICATIONS

This application claims the benefit of priority from U.S. Provisional Application No. 62/263,116 filed Dec. 4, 2015 and is related to U.S. application Ser. No. 15/163,360 filed May 24, 2016, which are each incorporated herein by reference in their entireties.

STATEMENT OF ACKNOWLEDGEMENT

This project was funded by the King Abdulaziz City for Science and Technology (KACST) through project number KACST-AT-35-131 and King Fahd University of Petroleum & Minerals (KFUPM).

BACKGROUND OF THE INVENTION

Technical Field

The present disclosure relates to cross-linked polymeric resins comprising anilines linked together with polyamine alkyl chains. Additionally, the present disclosure relates to applications of these cross-linked polymeric resins as agents for the removal of heavy metals, such as lead (II) and arsenic (V) from aqueous.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Despite the popular knowledge that over two-thirds of the earth's surface area is covered by water, only ~2.5% of this water is available as freshwater of which 69% is in the form of ice caps and glaciers. The need to recycle the limitedly available water is therefore inevitable as failure to do so poses great health risks. Heavy metals (such as lead and arsenic) disposed in water from various human activities, specifically industrial activities, even at trace levels, are a potential threat to animals and ultimately humans as they are non-biodegradable and their bioaccumulation in the human body can cause various diseases and disorders [S. L. Postel, G. C. Daily, P. R. Ehrlich, Human Appropriation Of Renewable FreshWater, Science (American Association for the advancement of science), 271 (1996) 785-788.; and M. Berger, M. Finkbeiner, Methodological Challenges in Volumetric and Impact-Oriented Water Footprints, Journal of Industrial Ecology, 17 (2013) 79-89.; and S. A. Ali, O. C. S. Al Hamouz, N. M. Hassan, Novel cross-linked polymers having pH-responsive amino acid residues for the removal of Cu2+ from aqueous solution at low concentrations, Journal of Hazardous Materials, 248-249 (2013) 47-58.; and Y. Sun, X. Guan, J. Wang, X. Meng, C. Xu, G. Zhou, Effect of Weak Magnetic Field on Arsenate and Arsenite Removal from Water by Zerovalent Iron: An XAFS Investigation, Environmental Science & Technology, 48 (2014) 6850-6858.; and K. A. Graeme Md, M. D. F. C. V. Pollack Jr, Heavy Metal Toxicity, Part I: Arsenic and Mercury, The Journal of Emergency Medicine, 16 (1998) 45-56.]. Removal of lead and arsenic is achieved by one or more of methods such as chemical precipitation, adsorption, biosorption, electrodialytic processes, ion exchange, ultra-filtration, reverse osmosis, electro-deposition, solvent extraction, foam-floatation, cementation, complexation/sequestration, filtration and evaporation. However, of all of these methods adsorption remains the most attractive due to the availability of several low cost and easily accessible environmentally friendly adsorbents [A. Denizli, K. Kesenci, Y. Arica, E. Pipkin Dithiocarbamate-incorporated monosize polystyrene microspheres for selective removal of mercury ions, Reactive and Functional Polymers, 44 (2000) 235-243.; and Y. Tao, L. Ye, J. Pan, Y. Wang, B. Tang, Removal of Pb(II) from aqueous solution on chitosan/TiO2 hybrid film, Journal of Hazardous Materials, 161 (2009) 718-722.; and O. C. S. Al Hamouz, S. A. Ali, Removal of heavy metal ions using a novel cross-linked polyzwitterionic phosphonate, Separation and Purification Technology, 98 (2012) 94-101.—each incorporated herein by reference in its entirety].

Lead poisoning is a well-known cause of neurobehavorial and cognitive deficits in children and adolescents [J. F. Rosen, Adverse health effects of lead at low exposure levels: trends in the management of childhood lead poisoning, Toxicology, 97 (1995) 11-17.—incorporated herein by reference in its entirety]. A recent study shows that early life exposure to lead poses a threat to fetal outcomes at birth and normal fetal growth [X. Xie, G. Ding, C. Cui, L. Chen, Y. Gao, Y. Zhou, R. Shi, Y. Tian, The effects of low-level prenatal lead exposure on birth outcomes, Environmental Pollution, 175 (2013) 30-34.—incorporated herein by reference in its entirety]. Arsenic has been associated with skin and internal cancer development in humans. Additional non-carcinogenic effects that are associated with arsenic include peripheral neuropathy, diabetes, and cardiovascular diseases [C. O. Abernathy, Y. P. Liu, D. Longfellow, H. V. Aposhian, B. Beck, B. Fowler, R. Goyer, R. Menzer, T. Rossman, C. Thompson, M. Waalkes, Arsenic: health effects, mechanisms of actions, and research issues, Environmental Health Perspectives, 107 (1999) 593-597.].

Polymeric materials based on formaldehyde resins have shown to be an important class of polymers that have been extensively used in a variety of applications. Such applications include insulation material, consolidated wood products, oil filters, abrasive binders, ion exchange membranes and carbon membranes upon carbonization [F. C. Dupre, M. E. Foucht, W. P. Freese, K. D. Gabrielson, B. D. Gapud, W. H. Ingram, T. E. McVay, R. A. Rediger, K. A. Shoemake, K. K. Tutin, J. T. Wright, Preparation of cyclic urea-formaldehyde polymer-modified phenol-formaldehyde and melamine-formaldehyde resin-based binders and their uses, in, Georgia-Pacific Resins, Inc., USA. 1999, pp. 49 pp.; and K. Lenghaus, G. G. Qiao, D. H. Solomon, The effect of formaldehyde to phenol ratio on the curing and carbonisation behaviour of resole resins, Polymer, 42 (2001) 3355-3362.; and N. Kishore, S. Sachan, K. N. Rai, A. Kumar, Synthesis and characterization of a nanofiltration carbon membrane derived from phenol-formaldehyde resin, Carbon, 41 (2003) 2961-2972.—each incorporated herein by reference in its entirety]. Mannich-type polycondensation reactions with formaldehyde have been employed for the production of polymers. Endo, et al. (2009) described the polymerization of a bifunctional benzoxazine from bisphenol-A and aniline with the resulting main chain having a phenolic moiety bridged by a Mannich-type linkage ($-CH_2-NR-CH_2-$) [T. Endo, A. Sudo, Development and application of novel ring-opening polymerizations to functional networked polymers, Journal of Polymer Science Part A: Polymer Chemistry, 47 (2009) 4847-4858.—incorporated herein by reference in its entirety]. Altinkok, et al.

(2011) also used similar monomers but sulfonediamine was used in place of aniline to prepare polybenzoxazine; however, there is no record of the application of these polyamines to determine their usability or effectiveness as adsorbents for metal ions [C. Altinkok, B. Kiskan, Y. Yagci, Synthesis and characterization of sulfone containing main chain oligobenzoxazine precursors, J. Polym. Sci., Part A: Polym. Chem., 49 (2011) 2445-2450.; and E. Tsuchida, T. Tomono, Polyamine polymers from pyrrole, formalin, and amines by use of the mannich reaction, Journal of Polymer Science: Polymer Chemistry Edition, 11 (1973) 723-735.—each incorporated herein by reference in its entirety]. Barak, et al. (2007) was able to synthesize a new chelating resin from nitrilotriacetic acid (NTA) and melamine using a Mannich-type reaction and subsequently tested it for heavy metal removal from simulated wastewater [A. Baraka, P. J. Hall, M. J. Heslop, Melamine-formaldehyde-NTA chelating gel resin: Synthesis, characterization and application for copper(II) ion removal from synthetic wastewater, Journal of Hazardous Materials, 140 (2007) 86-94.—incorporated herein by reference in its entirety]. Mannich-type polycondensation reactions have enabled researchers to produce polymers with specific functionalities or a combination of several desired functionalities for different applications including removal of heavy metals from wastewater [P. Chutayothin, H. Ishida, Cationic Ring-Opening Polymerization of 1,3-Benzoxazines: Mechanistic Study Using Model Compounds, Macromolecules, 43 (2010) 4562-4572.; and R. N. Singru, W. B. Gurnule, V. A. Khati, A. B. Zade, J. R. Dontulwar, Eco-friendly application of p-cresol-melamine-formaldehyde polymer resin as an ion-exchanger and its electrical and thermal study, Desalination, 263 (2010) 200-210.—each incorporated herein by reference in its entirety].

Many polymers with amine functionality have been reported for removal of heavy metals from wastewater. Gurnule, et al. (2002) studied the ion-exchange properties of a salicylic acid-melamine-formaldehyde terpolymer resin for seven metal ions including Co, Zn, Cu, Ni, Cd, Fe, and Pb ions [W. B. Gurnule, H. D. Juneja, L. J. Paliwal, Ion-exchange properties of a salicylic acid-melamine-formaldehyde terpolymer resin, Reactive and Functional Polymers, 50 (2002) 95-100.]. Singru, el al. (2010) also reported a similar study for the chelating ion-exchange ability of a p-Cresol-melamine terpolymer for these same metal ions. Liu, et al. (2010) functionalized poly(glycidyl methacrylate) (PGMA) beads with four aliphatic amines namely ethylenediamine (EDA), diethylenetriamine (DETA), triethylenetetramine (TETA), and tetraethylenepentamine (TEPA) and tested them for adsorption of Cu ions; results showed that the DETA-functionalized polymer was superior in adsorption capacity because of the relatively higher amine content [C. Liu, R. Bai, L. Hong, T. Liu, Functionalization of adsorbent with different aliphatic polyamines for heavy metal ion removal: Characteristics and performance, Journal of Colloid and Interface Science, 345 (2010) 454-460.—incorporated herein by reference in its entirety].

Polyaniline, especially, has been one of the most efficient of the chelating ion-exchange polyamines. Recent applications include its use as a component of composites with materials like silica gel, polypyrrole, graphene, etc. [M. Ghorbani, H. Esfandian, N. Taghipour, R. Katal, Application of polyaniline and polypyrrole composites for paper mill wastewater treatment, Desalination, 263 (2010) 279-284.; and X. Liu, Y. Gao, H. Luo, R. Jin, Synergistically constructed polyamine/nanosilica/graphene composites: preparation, features and removal of Hg2+ and dyes from contaminated water, RSC Advances, 4 (2014) 9594.—each incorporated herein by reference in its entirety]. Researchers have even introduced polyaniline coatings on various materials like mesoporous silica, silica gel, jute fiber, and saw dust [R. Ansari, F. Raofie, Removal of Mercuric Ion from Aqueous Solutions Using Sawdust Coated by Polyaniline, E-Journal of Chemistry, 3 (2006) 35-43.; and P. A. Kumar, M. Ray, S. Chakraborty, Hexavalent chromium removal from wastewater using aniline formaldehyde condensate coated silica gel, Journal of Hazardous Materials, 143 (2007) 24-32.; and P. A. Kumar, S. Chakraborty, Fixed-bed column study for hexavalent chromium removal and recovery by short-chain polyaniline synthesized on jute fiber, Journal of Hazardous Materials, 162 (2009) 1086-1098.; and S. Nayab, A. Farrukh, Z. Oluz, E. Tuncel, S. R. Tariq, H.u. Rahman, K. Kirchhoff, H. Duran, B. Yameen, Design and Fabrication of Branched Polyamine Functionalized Mesoporous Silica: An Efficient Absorbent for Water Remediation, ACS Applied Materials & Interfaces, 6 (2014) 4408-4417.—each incorporated herein by reference in its entirety]. However, most of these reports have not explored the use of these materials as adsorbents for heavy metal atoms and ions.

In view of the forgoing, one object of the present disclosure is to provide cross-linked polymeric resins formed from by reaction of aniline, one or more diaminoalkane monomers and an aldehyde to provide a polymeric material with improved amine chelate-forming functionality, and their spectroscopic characterization. Another object of the present disclosure is to provide a process for producing the cross-linked polymeric resins by the use of a Mannich-type polycondensation between an aniline compound and a diaminoalkane compound in the presence of an aldehyde and subsequent basification. In addition to the cross-linked polymeric resins and methods for their preparation, the present disclosure further aims to provide methods for efficiently removing heavy metals, such as lead (II) and arsenic (V) ions, from an aqueous solution by employing the adsorbent properties, examined by kinetic, diffusion, isotherm, and thermodynamic models, of the cross-linked polymeric resins described herein.

BRIEF SUMMARY OF THE INVENTION

According to a first aspect, the present disclosure relates to a cross-linked polymeric resin of formula (I)

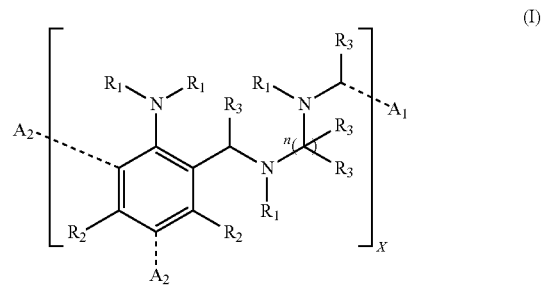

or a salt, solvate, tautomer or stereoisomer thereof; wherein
i) each $R_1$ is independently —H, an optionally substituted alkyl, an optionally substituted cycloalkyl, or an optionally substituted aryl, ii) each $R_2$ is independently —H, —F, —Cl, —Br, —CN, —OR$_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) n is a positive whole number in the range of 2-16, v) X is a positive whole number, and vi) $A_1$ forms a bond to $A_2$ of another monomer unit.

In one embodiment, each $R_1$ is —H.

In one embodiment, $R_1$ is —H, $R_2$ is —H, and $R_3$ is —H and the cross-linked polymeric resin of formula (I) is

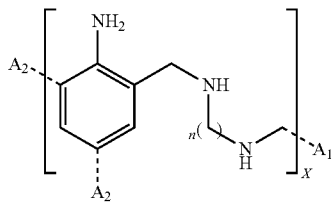

or a salt, solvate, tautomer or stereoisomer thereof wherein i) n is a positive whole number in the range of 4-12, ii) X is a positive whole number, and iii) $A_1$ forms a bond to $A_2$.

In one embodiment, the cross-linked polymeric resin is in the form of a pulverulent powder having a BET surface area in the range of 2.0 to 15.0 $m^2 g^{-1}$.

According to a second aspect, the present disclosure relates to a process for producing the cross-linked polymeric resin wherein each $R_1$ is –H comprising i) reacting an aniline compound with a diaminoalkane compound in the presence of an aldehyde to form a cross-linked polyamine terpolymer and ii) treating the cross-linked polyamine terpolymer with a base to form the cross-linked polymer resin wherein each $R_1$ is —H.

In one embodiment, the molar ratio of the aldehyde to the aniline is in the range of 4:1 to 8:1.

In one embodiment, the molar ratio of the diaminoalkane to the aniline is in the range of 1:1 to 5:1.

In one embodiment, the aniline compound is aniline, the aldehyde is paraformaldehyde and the diaminoalkane compound is at least one selected from the group consisting of 1,4-diaminobutane, 1,6-diaminohexane, 1,8-diaminooctane, 1,10-diaminodecane, and 1,12-diaminododecane.

According to a third aspect, the present disclosure relates to a method for removing a heavy metal from an aqueous solution comprising i) contacting the cross-linked polymeric resin with the aqueous solution comprising at least one heavy metal and ii) adsorbing the heavy metal onto the cross-linked polymeric resin to form a heavy metal loaded cross-linked polymeric resin and a heavy metal-depleted aqueous solution.

In one embodiment, the method further comprises i) desorbing the heavy metal from the heavy metal loaded cross-linked polymeric resin by treating with an acid to form a cross-linked polyamine terpolymer, ii) treating the cross-linked terpolymer with a base to reform the cross-linked polymeric resin and iii) reusing the cross-linked polymeric resin up to 15 times without a loss in adsorption capacity.

In one embodiment, the heavy metal is at least one ion selected from the group consisting of Co, Cu, Zn, As, Sr, Mo, Cd and Pb.

In one embodiment, the heavy metal is at least one selected from the group consisting of lead (II) and arsenic (V).

In one embodiment, the cross-linked polymeric resin has an adsorption capacity in the range of 100-1000 µg of heavy metal per g of the cross-linked polymeric resin.

In one embodiment, the aqueous solution has a pH in the range of 2 to 8.

In one embodiment, the aqueous solution has an initial heavy metal concentration in the range of 50 µg $L^{-1}$ to 1250 µg $L^{-1}$.

In one embodiment, the cross-linked polymeric resin is present at a concentration in the range of 0.05-5.0 g of resin per L of the aqueous solution during the contacting.

In one embodiment, the cross-linked polymeric resin is contacted with the aqueous solution for 0.1 to 24 hours.

In one embodiment, the contacting is performed at a temperature in the range of 20° C. to 60° C.

In one embodiment, greater than 80% of the total mass of the heavy metal is removed from the aqueous solution.

In one embodiment, each $R_1$, $R_2$, and $R_3$ is —H and n is 4, the aqueous solution comprises lead (II) and at least one additional heavy metal selected from the group consisting of Co, Cu, Zn, As, Sr, Mo, and Cd, and greater than 90% of the total mass of lead (II) is removed from the aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
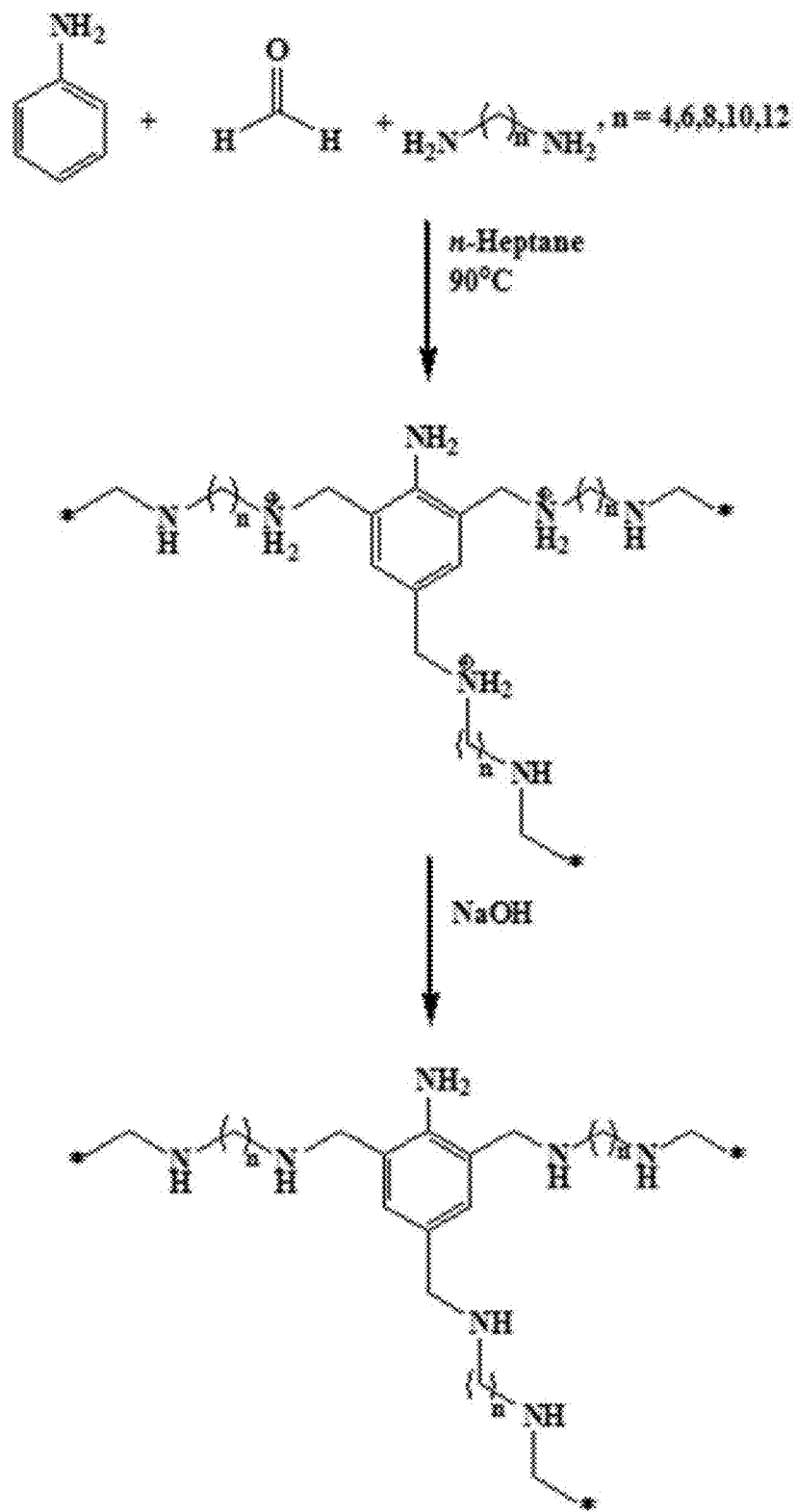
FIG. 1 is a synthetic scheme for the production of a series of polyamine cross-linked polymeric resins of formula (I) wherein $R_1$ is —H from the reaction of aniline and a series of diaminoalkanes in the presence of paraformaldehyde to form a series of terpolymer amino cross-linked polymeric resins of formula (1) wherein $R_1$ is —H followed by subsequent basification.

Referring now to the drawings. Embodiments of the present disclosure will now be described more fully hereinafter with reference to the accompanying drawings, in which some, but not all of the embodiments of the disclosure are shown. The present disclosure will be better understood with reference to the following definitions.

According to a first aspect, the present disclosure relates to a cross-linked polymeric resin of formula (I)

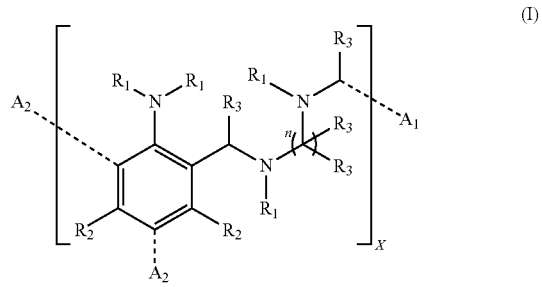

or a salt, solvate, tautomer or stereoisomer thereof wherein i) each $R_1$ is independently —H, an optionally substituted alkyl, an optionally substituted cycloalkyl, or an optionally substituted aryl, ii) each $R_2$ is independently —H, —F, —Cl, —Br, —CN, —$OR_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) n is a positive whole number in the range of 2-16, v) X is a positive whole number, and vi) $A_1$ forms a bond to $A_2$ of another monomer unit. In all embodiments, $R_1$ is not —$CS_2^-Z^+$ wherein Z is —H or an alkali metal counter ion, thus the substituted alkyl is preferably not a dithiocarbamate moiety.

The cross-linked polymeric resin of the present disclosure is generally described as central aniline units linked via the ortho, para or mixtures thereof, sites of the aniline phenyl ring to another ortho, para or mixtures thereof, site of an additional aniline unit through diaminoalkane chains with n representing repeating alkyl $(CR_3R_3)_n$ groups of varying length through a mannich type polycondensation with an aldehyde forming a $CHR_3$ linker. Formula (I) may represent the smallest repeating unit of the cross-linked polymeric resin with $A_1$ forming a bond to an $A_2$ group of another aniline core (ortho, para, or mixtures thereof) or central unit.

As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a port of the polymer or resin whose repetition would produce the complete polymer chain (excluding the end groups) by linking the repeating units together successively along the chain. The process by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may formed by chemical reactions that are initiated by heat, pressure, change in pH, and/or radiation, with or without the presence of a cross-linking agent and/or catalyst. In certain embodiments, at least one diaminoalkane functions as a cross-linking agent for the cross-linked polymeric resin described herein. In a preferred embodiment the diaminoalkane chains function as cross-linking agents or monomers.

As used herein, the terms "compound" and "complex" refer to a chemical entity, whether in the solid, liquid or gaseous phase, as well as in a crude mixture or purified and isolated form. The chemical transformations and/or reactions described herein are envisaged to proceed via standard laboratory and experimental techniques in regard to performing the reaction as well as standard purification, isolation and characterization protocols known to those of ordinary skill in the art.

As used herein, the term "salt" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts include, but are not limited to, the conventional non-toxic salts or the quaternary ammonium salts of the parent compound formed, for example, from non-toxic inorganic or organic acids. Exemplary conventional non-toxic salts include those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic and mixtures thereof and the like. Further, salts of carboxylic acid containing compounds may include cations such as lithium, sodium, potassium, magnesium, and the like. The salts of the present disclosure can be synthesized from the parent compound that contains a basic or acidic moiety by conventional chemical methods. Generally such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates ethanolates, methanolates, isopropanolates and mixtures thereof. Methods of solvation are generally known to those of ordinary skill in the art.

As used herein, the term "tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special case of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), enamine and enamine and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomerism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation about the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkyl sulfonyl, aryl sulfonyl, aryl alkyl sulfonyl, sulfonamide (e.g. —$SO_2NH_2$), substituted sulfonamide, nitro, cyano, carboxy, carbamyl (e.g. —$CONH_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. In embodiments wherein $R_1$ is an optionally substituted alkyl, the optionally substituted alkyl $R_1$ is preferably not a dithiocarbamate moiety. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

According to a first aspect, the present disclosure relates to a cross-linked polymeric resin of formula (I)

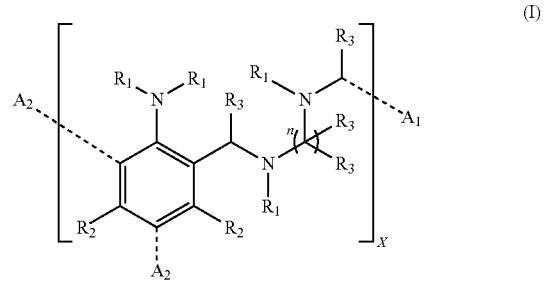

or a salt, solvate, tautomer or stereoisomer thereof wherein i) each $R_1$ is independently —H, an optionally substituted alkyl, an optionally substituted cycloalkyl, or an optionally substituted aryl, ii) each $R_2$ is independently —H, —F, —Cl, —Br, —CN, —$OR_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) n is a positive whole number in the range of 2-16, v) X is a positive whole number, and vi) $A_1$ forms a bond to $A_2$ of another aniline monomer unit. In all embodiments, $R_1$ is not —$CS_2^-Z^+$ wherein Z is —H or an alkali metal counter ion, thus the substituted alkyl is preferably not a dithiocarbamate moiety.

In a preferred embodiment, each $R_1$ is independently —H, an optionally substituted alkyl, an optionally substituted cycloalkyl, or an optionally substituted aryl, more preferably, each $R_1$ is independently —H, most preferably each $R_1$ is —H. In a preferred embodiment, the ratio of $R_1$ sites where $R_1$ is —H to $R_1$ sites where $R_1$ is not —H is greater than 0.33:1, preferably greater than 1:1, preferably greater than 3:1, preferably greater than 5:1, preferably greater than 7:1, preferably greater than 10:1, preferably greater than 20:1, preferably greater than 40:1, preferably greater than 60:1, preferably greater than 80:1, preferably greater than 100:1, preferably greater than 150:1, preferably greater than 200:1, preferably greater than 300:1, preferably greater than 400:1, preferably the ratio of $R_1$ sites where $R_1$ is —H to $R_1$ sites where $R_1$ is not —H is greater than 500:1. In a most preferred embodiment, each $R_1$ is —H.

In a preferred embodiment, each $R_2$ is independently —H, —F, —Cl, —Br, —CN, —$OR_3$, an optionally substituted alkyl, an optionally substituted cycloalkyl, or an optionally substituted aryl, most preferably each $R_2$ is independently —H. In a preferred embodiment, each $R_3$ is independently —H, an optionally substituted alkyl, an optionally substituted cycloalkyl, or an optionally substituted aryl, most preferably each $R_3$ is independently —H.

In a preferred embodiment, n is a positive whole number in the range of 2-16, preferably 3-14, preferably 4-12, preferably n is a positive whole number equal to 4, 6, 8, 10, or 12. In one embodiment, the value of n denotes a straight alkyl chain of $CH_2$ groups, and it is equally envisaged that this alkyl chain moiety may be optionally substituted as described herein. In a preferred embodiment, X is a positive whole number; preferably X is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50. In certain embodiments, the repeating unit X may be repeated in the cross-linked polymeric resin of formula (I) from 10 to 10000 times, preferably 20 to 5000 times, more preferably 25 to 2500 times, more preferably 50 to 1500 times, more preferably 100 to 1000 times. It is equally envisaged that values for X may fall outside of these ranges and still provide suitable cross-linked polymeric resin of formula (I) material.

In a more preferred embodiment, each $R_1$ is —H, each $R_2$ is —H, and each $R_3$ is —H, and the cross-linked polymeric resin of formula (I) is

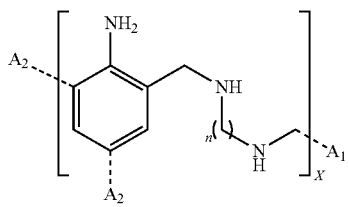

or a salt, solvate, tautomer or stereoisomer thereof wherein i) n is a positive whole number in the range of 4-12, preferably n is a positive whole number equal to 4, 6, 8, 10, or 12, ii) X is a positive whole number, preferably X is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and iii) $A_1$ forms a bond to $A_2$.

The cross-linked polymeric resin of the present disclosure is generally described as central aniline units linked via the ortho, meta, para or mixtures thereof sites of the aniline phenyl ring to another ortho, meta, para or mixtures thereof site of an additional aniline unit through diaminoalkane chains through a mannich type polycondensation with an aldehyde forming a $CHR_3$ linker. In certain embodiments, one or more of the central aniline units or aniline cores may not be fully substituted at all three positions (ortho, meta, para). For example, some aniline cores may only have a single ortho chain, or one ortho and one para chain attached, most preferably two ortho chains and one para chain attached. In certain embodiments, at least one diaminoalkane functions as a cross-linking agent for the cross-linked polymeric resin described herein. In a preferred embodiment the diaminoalkane chains function as cross-linking agents or monomers. In certain embodiments, the cross-linked polymeric resin may be additionally represented by formula (II).

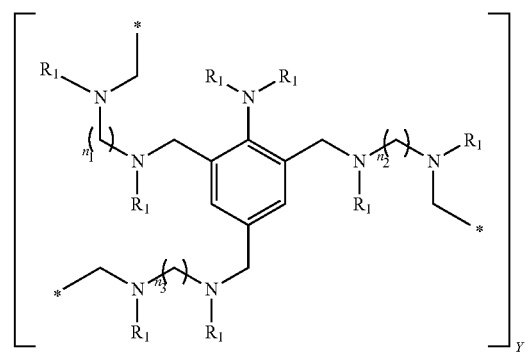

or a salt, solvate, tautomer or stereoisomer thereof wherein each $R_1$ is independently —H, an optionally substituted alkyl, an optionally substituted cycloalkyl, or an optionally substituted aryl, more preferably each $R_1$ is independently —H, or —$CS_2Z^+$, more preferably each $R_1$ is —H, most preferably each $R_1$ is —H and $R_1$ is not —$CS_2^-Z^+$ wherein Z is —H or an alkali metal counter ion, thus the substituted alkyl is preferably not a dithiocarbamate moiety, each n ($n_1$, $n_2$, $n_3$) is independently a positive whole number in the range of 4-12, preferably n is a positive whole number equal to 4, 6, 8, 10, or 12, Y is a positive whole number, preferably Y is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and each (*) represents an ortho, meta, para or mixtures thereof site of an additional aniline phenyl ring. In certain embodiments, the cross-linked polymeric resin of the present disclosure may comprise multiple different values of n ($n_1 \neq n_2 \neq n_3$), in other embodiments $n_1 = n_2 \neq n_3$, $n_1 \neq n_2 = n_3$, and more preferably $n_1 = n_2 = n_3$. In a preferred embodiment, each $R_1$ is —H. In a more preferred embodiment, each $R_1$ is —H and the cross-linked polymeric resin of formula (II) is

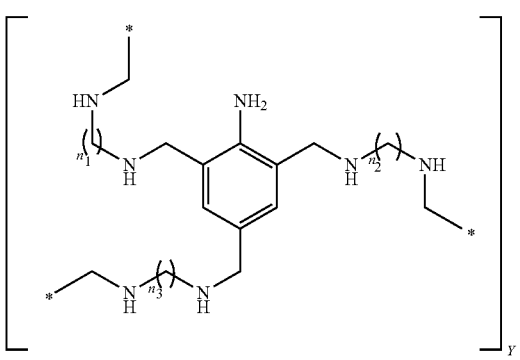

or a salt, solvate, tautomer or stereoisomer thereof wherein each n ($n_1$, $n_2$, $n_3$) is independently a positive whole number in the range of 4-12, preferably n is a positive whole number equal to 4, 6, 8, 10, or 12, Y is a positive whole number, preferably Y is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and each (*) represents an ortho, meta, para or mixtures thereof site of an additional aniline phenyl ring.

In certain embodiments, the cross-linked polymeric resin of the present disclosure may describe copolymers. Such copolymers may include, but are not limited to, copolymers of the cross-linked polymeric resin of formula (I) and other polymeric materials, copolymers wherein $n_1 \neq n_2 \neq n_3$, and/or copolymers of varying aniline and/or varying diaminoalkane monomeric units and mixtures thereof. Since a copolymer consists of at least two types of constituent units (structural units) copolymers can be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked polymeric resin of the present disclosure may refer to an alternating copolymer, a periodic copolymer, a statistical copolymer, a random copolymer or mixtures thereof.

Copolymers are also described in terms of the existence of or arrangement of branches in the polymer structure. Linear copolymers consist of a single main chain whereas branched copolymers consist of a single main chain with one or more polymeric side chains. The cross-linked polymeric resin of the present disclosure may refer to a linear copolymer, a branched copolymer, and other special types of branched copolymers including star copolymers, brush copolymer, comb copolymers and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or more distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The cross-linked polymeric resin of the present disclosure may describe a block copolymer, a stereoblock copolymer or mixtures thereof.

A graft macromolecule refers to a macromolecule with one or more species of block connected to the main chain as side chains, these side chains having constitutional or configurational features that differ from those in the main chain. Graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. As with block copolymers, the quasi-composite graft copolymer product has properties of both "components". The cross-linked polymeric resin of the present disclosure may refer to a graft copolymer.

In general, polymeric mixtures are far less miscible than mixtures of small molecules. This is a result of the driving force for mixing usually being entropy, rather than interaction energy. Miscible materials generally form a solution not because their interaction with each other is more favorable than their self-interaction, but because of an increase in entropy and hence free energy associated with increasing the amount of volume available to each component. This tends to increase the free energy of mixing for much larger polymeric molecules in polymer solutions and thus makes solvation less favorable. In dilute solution, the properties of the polymer are characterized by the interaction between the solvent and the polymer. In a good solvent, the polymer appears swollen and occupies a large volume, the intermolecular forces between the solvent and monomer subunits dominate over intramolecular interactions. In a bad solvent or poor solvent, intramolecular forces dominate and the chain contracts.

A synthetic polymer may be loosely described as crystalline if it contains regions of three-dimensional ordering on atomic (rather than macromolecular) length scales, usually arising from intramolecular folding and/or stacking of adjacent chains. The cross-linked polymeric resins described herein may consist of both crystalline and amorphous regions; the degree of crystallinity may be expressed in terms of a weight fraction or volume fraction of crystalline material. The crystallinity of polymers may be characterized by their degree of crystallinity, ranging from zero for a completely non-crystalline polymer to one for a theoretical completely crystalline polymer. In a preferred embodiment, the cross-linked polymeric resin of the present disclosure exhibits a semi-crystalline nature. In a preferred embodiment, the cross-linked polymeric resin series of the present disclosure has a degree of crystallinity in the range of 0.1-0.8, preferably 0.2-0.6, preferably 0.3-0.5. Polymers with microcrystalline regions are generally tougher (can be bent more without breaking) and more impact resistant than totally amorphous polymers. Polymers with a degree of crystallinity approaching zero or one will tend to be transparent, while polymers with intermediate degrees of crystallinity will tend to be opaque due to light scattering by crystalline or glassy regions. Polymers are known to behave in as crystalline materials under X-ray when their chains are closely packed in an orderly manner. A simple explanation for this behavior in the cross-linked polymeric resin described herein may result from a high chelating ability of the polymer. Chelation of suitable monocation ions, or chelation of metal ions in between the long polymer chains may result in a form of chain stacking by inter chain chelation. In a preferred embodiment, as the value of n increases the degree of crystallinity of the cross-linked polymeric resin increases.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In a preferred embodiment, the cross-linked polymeric resin of the present disclosure is in the form of a pulverulent powder having a BET surface area. In a preferred embodiment, the cross-linked polymeric resin of the present disclosure has a BET surface area in the range of 2.0-15.0 $m^2$ $g^{-1}$, preferably 3.0-14.0 $m^2$ $g^{-1}$, preferably 3.5-12.0 $m^2$ $g^{-1}$, preferably 4.0-11.5 $m^2$ $g^{-1}$. In certain embodiments, larger values of n in the cross-linked polymeric resins of the present disclosure lead to larger surface areas, longer chains lead to larger pores and hence larger surface area. In one embodiment, the cross-linked polymeric resin of formula (I) wherein n is 12 has a BET surface area that is at least 3 times the BET surface area of the cross-linked polymeric resin of formula (I) wherein n is 4, preferably at least 2.75 times, preferably at least 2.5 times, preferably at least 2.0 times the BET surface area of the cross-linked polymeric resin of formula (I) wherein n is 4.

According to a second aspect, the present disclosure relates to a process for producing the cross-linked polymeric resin of formula (I) described herein in any of its embodiments comprising i) reacting an aniline compound with a diaminoalkane compound in the presence of an aldehyde to form the cross-linked polyamine terpolymer and ii) treating the cross-linked polyamine terpolymer with a base to form the cross-linked polymeric resin wherein each $R_1$ is —H.

In one step of the process an aniline compound and a series of diaminoalkanes are linked together with an aldehyde via a Mannich-type polycondensation. As used herein a polycondensation refers to a polymerization or polymer formation that is a form of step growth polymerization where molecules join together losing small molecules as byproducts such as water or methanol, preferably water. This is in contrast to addition polymerizations which often involve the reaction of unsaturated monomers. The type of end product resulting from the polycondensation is dependent on the number of functional end groups of the monomeric molecules which can react. As used herein, the Mannich reaction refers to a multicomponent organic reaction which consists of an amino alkylation of an acidic proton. In certain embodiments, the reaction starts with the formation of an iminium ion from the aldehyde and the diaminoalkane. The aniline compound is highly susceptible to electrophilic substitution reactions, this high reactivity reflecting that is it is an enamine, which enhances the electron-donating ability of the ring and can attack the iminium ion once generated, preferably at the ortho and para positions of the aniline compound.

In a preferred embodiment, the aniline compound is a compound of formula (III)

or a salt, solvate, tautomer or stereoisomer thereof, wherein each $R_2$ is independently —H, —F, —Cl, —Br, —CN, —OR$_3$, an optionally substituted alkyl, an optionally substituted cycloalkyl, or an optionally substituted aryl, preferably each $R_2$ is —H. In a preferred embodiment, the compound of formula (III) is

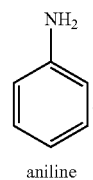

aniline

In a preferred embodiment, the diaminoalkane compound is a compound of formula (IV)

or a salt, solvate, tautomer or stereoisomer thereof, wherein each $R_3$ is independently —H, an optionally substituted alkyl, an optionally substituted cycloalkyl, or an optionally substituted aryl, preferably each $R_3$ is —H and n is a positive whole number in the range of 2-16, preferably 4-12. In a preferred embodiment the compound of formula (IV) is

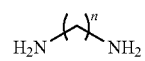

wherein n is a positive whole number in the range of 2-16, preferably 4-12, preferably wherein n is a positive whole number equal to 4, 6, 8, 10, or 12 and the diaminoalkane compound is at least one selected from the group consisting of 1,4-diaminobutane, 1,6-diaminohexane, 1,8-diaminocatane, 1,10-diaminodecane, and 1,12-diaminododecane.

In a preferred embodiment, the aldehyde is a compound of formula (V)

or a salt, solvate, tautomer or stereoisomer thereof, wherein each $R_3$ is independently —H, an optionally substituted alkyl, an optionally substituted cycloalkyl, or an optionally substituted aryl, preferably each $R_3$ is —H. In a preferred embodiment the compound of formula (V) is

formaldehyde or its homopolymer paraformaldehyde.

In a preferred embodiment, the reacting of the aniline compound with the diaminoalkane is performed in a non-polar solvent, preferably n-heptane as the reaction medium. Exemplary additional non-polar solvents that may be used in addition to, or in lieu of n-heptane include, but are not limited to pentane, cyclopentane, hexane, cyclohexane, benzene, toluene, 1,4-dioxane, chloroform, diethyl ether, dichloromethane, and mixtures thereof. It is equally envisaged that the reaction may be adapted to be performed in a polar aprotic solvent (i.e. tetrahydrofuran, ethyl acetate, acetone, dimethylformamide, acetonitrile, dimethyl sulfoxide, nitromethane and propylene carbonate), a polar protic solvent (i.e. methanol, formic acid, n-butanol, isopropanol, n-propanol, ethanol, acetic acid and water), and mixtures thereof. In a preferred embodiment, the reaction is performed at a concentration of the aniline compound in the range of 0.01-1.0 M, preferably 0.05-0.80 M, preferably 0.10-0.60 M, preferably 0.20-0.40 M, preferably 0.25-0.35 M.

In a preferred embodiment, the aldehyde is present in the reaction in a molar excess to the aniline compound. In a preferred embodiment, the molar ratio of the aldehyde to the aniline compound is in the range of 4:1 to 8:1, preferably 4.5:1 to 7.5:1, preferably 5:1 to 7:1, preferably 5.5:1 to 6.5:1, or about 6:1. In a preferred embodiment, the diaminoalkane is present in the reaction in a molar equivalent or molar excess to the aniline compound. In a preferred embodiment, the molar ratio of the diaminoalkane to the aniline compound is in the range of 1:1 to 5:1, preferably 1.5:1 to 4.5:1, preferably 2:1 to 4:1, preferably 2.5:1 to 3.5:1, or about 3:1. In a preferred embodiment, the molar ratio of the aldehyde to the diaminoalkane is in the range of 1.1:1 to 4:1, preferably 1.5:1 to 3:1, preferably 1.75:1 to 2.5:1, or about 2:1.

In a preferred embodiment, the reaction is performed under mechanical stirring, preferably a magnetic stirrer at a temperature of up to 115° C., preferably 20-110° C., preferably 40-105° C., preferably 60-100° C., preferably 80-95° C., or about 90° C. and has a stirred reaction time of up to 48 hours, preferably 2-44 hours, preferably 8-38 hours, preferably 12-32 hours, preferably 18-30 hours, or about 24 hours. In a preferred embodiment, this reaction results in a resinous material that may be separated (filtered off), crushed and soaked in water for up to 48 hours, preferably up to 36 hours, preferably up to 24 hours and then filtered and dried under vacuum at 20-100° C., preferably 40-80° C., or about 60° C. until a constant weight is achieved. In a preferred embodiment, this reaction has a yield of greater than 40%, preferably greater than 45%, preferably greater than 50%, preferably greater than 60%, preferably greater than 65%, preferably greater than 70%, preferably greater than 75%, preferably greater than 80%.

In one step of the process, the cross-linked polyamine terpolymer is treated with a base to form the cross-linked polymeric resin wherein each $R_1$ is —H. The base treatment is performed to insure the absence of quaternary ammonium ions that could decrease the ability of the cross-linked polymeric resins to remove toxic metal ions. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a strong base, preferably and alkali metal hydroxide, most preferably sodium hydroxide (NaOH). In a preferred embodiment the cross-linked polyamine terpolymer is a compound of formula (VI)

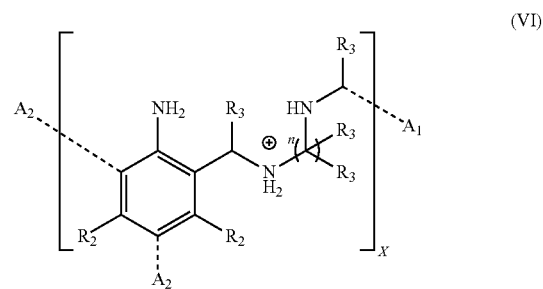

or a salt, solvate, tautomer or stereoisomer thereof, wherein each $R_2$ is independently —H, —F, —Cl, —Br, —CN, —$OR_3$, an optionally substituted alkyl, an optionally substituted cycloalkyl, or an optionally substituted aryl, preferably each $R_2$ is —H, each $R_3$ is independently —H, an optionally substituted alkyl, an optionally substituted cycloalkyl, or an optionally substituted aryl, preferably each $R_3$ is —H, n is a positive whole number in the range of 2-16, preferably 4-12, X is a positive whole number, and $A_1$ forms a bond to $A_2$. In a preferred embodiment, the compound of formula (VI) is

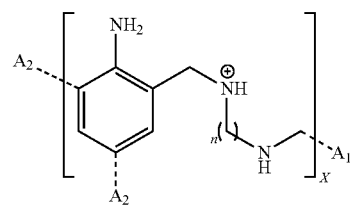

wherein n is a positive whole number in the range of 4-12, preferably wherein n is a positive whole number equal to 4, 6, 8, 10, or 12, X is a positive whole number, and $A_1$ forms a bond to $A_2$.

In a preferred embodiment, the treating of the cross-linked polyamine terpolymer with a base is performed in a polar protic solvent, preferably distilled water as the reaction medium. Exemplary additional polar protic solvents the may be used in addition to, or in lieu of distilled water include, but are not limited to, methanol, formic acid, n-butanol, isopropanol, n-propanol, ethanol, acetic acid. It is equally envisaged that the reaction may be adapted to be performed in a non-polar solvent (i.e. n-heptane, pentane, cyclopentane, hexane, cyclohexane, benzene, toluene, 1,4-dioxane, chloroform, diethyl ether, and dichloromethane), a polar aprotic solvent (dimethylformamide, tetrahydrofuran, ethyl acetate, acetone, acetonitrile, dimethyl sulfoxide, nitromethane, propylene carbonate), and mixtures thereof. In a preferred embodiment, the reaction is performed at a concentration of the cross-linked polyamine terpolymer in the range of 0.05-2.5 M, preferably 0.075-2.0 M, preferably 0.1-1.5 M, preferably 0.15-1.25 M, preferably 0.175-1.0 M.

In a preferred embodiment, the base is present in the reaction in a molar excess to the cross-linked polyamine terpolymer. In a preferred embodiment, the molar ratio of the base to the cross-linked polyamine terpolymer is in the range of 2:1 to 12:1, preferably 4:1 to 10:1, preferably 6:1 to 8:1, or about 7:1.

In a preferred embodiment, the reaction is performed under mechanical stirring, preferably a magnetic stirrer at a temperature of up to 80° C., preferably 10-60° C., preferably 15-40° C., preferably 20-30° C., preferably 22-28° C., or about 25° C. and has a stirred reaction time of up to 48 hours, preferably 2-44 hours, preferably 8-38 hours, preferably 12-32 hours, preferably 18-30 hours, or about 24 hours. In a preferred embodiment, this reaction results in a resinous material that may be separated (filtered off), crushed and washed with water and then dried under vacuum at 20-100° C., preferably 40-80° C., or about 60° C. until a constant weight is achieved. In a preferred embodiment, this reaction has a yield of greater than 65%, preferably greater than 70%, preferably greater than 75%, preferably greater than 80%, preferably greater than 85%, preferably greater than 90%, preferably greater than 95%, preferably greater than 99%.

According to a third aspect, the present disclosure relates to a method for removing a heavy metal from an aqueous solution comprising i) contacting the cross-linked polymeric resin of formula (I) described herein in any of its embodiments with an aqueous solution comprising at least one heavy metal and ii) adsorbing the heavy metal onto the cross-linked polymeric resin to form a heavy metal loaded cross-linked polymeric resin.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the cross-linked polymeric resin of the present disclosure in any of its embodiments with heavy metal contaminated water sources and systems. The methods may be carried out in tanks, containers, or small scale applications in both batch mode and fixed-bed or column mode.

The heavy metal ion is preferably removed by adsorption, meaning the process is primarily physical and preferably no chemical changes are made upon the cyclopolymeric resin or the metal ion. As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the cross-linked polymeric resin). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof.

As used herein, a ligand refers to in coordination chemistry an ion or molecule (functional group) that binds a central metal atom to form a coordination complex. The binding between metal and ligand generally involves formal donation of one or more of the ligand's electron pairs. The nature of the metal-ligand bonding can range from covalent to ionic and the metal-ligand bond order can range from one to three. Ligands are classified in many ways including, but not limited to, size (bulk), the identity of the coordinating atom(s), and the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the cross-linked polymeric resin may adsorb or bind with one or more heavy metal ions by monodentate coordination, or polydentate chelation including, but not limited to bidentate chelation or tridentate chelation to the metal ion to form a heavy metal loaded cross-linked polymeric resin.

The performance of an adsorbent material, polymers inclusive, is largely dependent on the type of functionality it carries. The presence of chelating functionalities such as thiocarbamate, thiol, carbonyl, phosphoryl and amine moieties is known to enhance the performance of materials towards the removal of heavy metal ions from aqueous solutions. The moieties have a known ability to form strong complexes with heavy metal ions. The cross-linked polymeric resins of formula (I) preferably feature at least one amine group, preferably a plurality of amine groups present in the same repeating unit. In a preferred embodiment, each repeating unit in the cross-linked polymeric resin of the present disclosure of formula (I) includes multiple ligand center or chelating centers (i.e —NH, and the like) to which one or more heavy metal ions can be coordinated. In certain embodiments, the number of ligand centers in a repeating unit of the cyclopolymeric resin may depend on the values of X, n, or both and is in the range of 1-250, preferably 2-200, preferably 5-175, preferably 10-150, preferably 15-100, preferably 20-75, preferably 25-50.

The metal ions that are coordinated to the plurality of ligands centers (i.e. amine moieties) are preferably heavy metal ions. In a preferred embodiment, a heavy metal has a density of greater than 3.5 $g/cm^3$ and/or an atomic weight of greater than 20. Exemplary metal ions that can be adsorbed by the cross-linked polymeric resin of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof. Further, these metal ions may be of any oxidation state $M^{+1}$, $M^{+2}$, $M^{+3}$, etc. In a preferred embodiment, the heavy metal is at least one selected from the group consisting of Co, Cu, Zn, Hg, As, Sr, Mo, Cd, and Pb, most preferably the heavy metal ion is at least one selected from the group consisting of lead (II), Pb (II) and arsenic (V), As (V). It is equally envisaged that the cross-linked polymeric resin may be adapted or chemically modified to adsorb, incorporate and/or bind additional metal ions in addition to, or in lieu of lead (II) and arsenic (V) and may bind selectively or collectively. In one embodiment, the additional metal ion may be any ion which is suitably coordinated by the cross-linked polymeric resin of formula (I) in any of its embodiments. Exemplary additional metal ions include, but are not limited to, an alkali metal (Li, Na, K, etc.), and alkaline earth metal (Mg, Ca, Sr, etc.) a lanthanide metal (La, Ce, Eu, Yb, etc.) an actinide metal (Ac, Th, etc.) or a post-transition metal (Al, Sn, Pb, In, etc.). Preferably the additional metal ion is a transition metal ion, most preferably a heavy metal ion.

As used herein, the binding constant is a special case of the equilibrium constant (K or $K_a$). It is associated with the binding and unbinding reaction of receptor and ligand molecules. The reaction is characterized by the on-rate constant and the off-rate constant. In equilibrium, the forward binding transition should be balanced by the backward unbinding transition. The binding constant or association constant is defined by the on-rate constant divided by the off-rate constant or the concentration or the concentration of receptor-ligand complexes (i.e. heavy metal loaded polymeric resins) divided by the concentration of unbound free receptors and divided by the concentration of unbound free ligands. In certain embodiments, the binding of iron ion or arsenic ion by the cross-linked polymeric resins follows a greater than 1:1 stochiometric complex formation, preferably greater than 2:1, preferably greater than 4:1, preferably greater than 8:1, preferably greater than 25:1, preferably greater than 50:1, preferably greater than 100:1, preferably greater than 200:1. In certain embodiments, an amine functionality of the cross-linked polymeric resin of formula (I) in any of its embodiments has a lead (II) or arsenic (V) binding constant in the range of $0.1 \times 10^7$ $L \cdot mol^{-1}$ to $5.0 \times 10^7$ $L \cdot mol^{-1}$, preferably $0.5 \times 10^7$ $L \cdot mol^{-1}$ to $1.5 \times 10^7$ $L \cdot mol^{-1}$, preferably $0.6 \times 10^7$ $L \cdot mol^{-1}$ to $1.4 \times 10^7$ $L \cdot mol^{-1}$, preferably $0.7 \times 10^7$ $L \cdot mol^{-1}$ to $1.3 \times 10^7$ $L \cdot mol^{-1}$, preferably $0.8 \times 10^7$ $L \cdot mol^{-1}$ to $1.2 \times 10^7$ $L \cdot mol^{-1}$, $0.9 \times 10^7$ $L \cdot mol^{-1}$ to $1.1 \times 10^7$ $L \cdot mol^{-1}$, preferably $0.95 \times 10^7$ $L \cdot mol^{-1}$ to $1.05 \times 10^7$ $L \cdot mol^{-1}$, or about $1.0 \times 10^7$ $L \cdot mol^{-1}$. In a preferred embodiment, an amine functionality of the cross-linked polymeric resin of formula (I) in any of its embodiments has a binding constant for metal ions that are not lead (II) or arsenic (V) in the range of 1.0 to $1.0 \times 10^{-10}$ times its lead (II) or arsenic (V) binding constant, preferably 0.1 to $1.0 \times 10^{-9}$ times, 0.01 to $1.0 \times 10^{-8}$ times, preferably 0.001 to $1.0 \times 10^{-7}$ times 0.0001 to $1.0 \times 10^{-5}$ times its lead (II) or arsenic (V) binding constant.

In one embodiment, the cross-linked polymeric resin of the present disclosure is effective in removing heavy metal from aqueous samples wherein the initial concentration of the heavy metal ion, preferably lead (II) or arsenic (V) in the aqueous solution is in the range of 50-1250 µg $L^{-1}$, preferably 100-1100 µg $L^{-1}$, preferably 400-1075 mg $L^{-1}$, preferably 800-1050 mg $L^{-1}$ or alternatively 5-500 ppm, preferably 10-200 ppm, preferably 15-100 ppm, preferably 20-80 ppm. In a preferred embodiment, the cross-linked polymeric resin is present in the aqueous solution and/or contacted with the aqueous solution within a concentration range of 0.05-5.0 grams of resin per liter volume of the treated aqueous solution, preferably 0.5-4.0 g $L^{-1}$, preferably 0.75-3.0 g $L^{-1}$, preferably 1.0-2.0 g $L^{-1}$ or about 1.5 g $L^{-1}$ of the resin relative to the volume of the aqueous solution.

In a preferred embodiment, the cross-linked polymeric resin of the present disclosure has an adsorption capacity of at least 100-1000 µg of heavy metal per g of the cross-linked polymeric resin, preferably at least 200 µg of heavy metal per g of the cross-linked polymeric resin, preferably at least 250 µg $g^{-1}$, preferably at least 300 µg $g^{-1}$, preferably at least 350 µg $g^{-1}$, preferably at least 400 µg $g^{-1}$, preferably at least 450 µg $g^{-1}$, preferably at least 500 µg $g^{-1}$, preferably at least 550 µg $g^{-1}$, preferably at least 600 µg $g^{-1}$, preferably at least 650 µg $g^{-1}$, preferably at least 700 µg $g^{-1}$, preferably at least 750 µg $g^{-1}$, preferably at least 800 µg of heavy metal per g of the cross-linked polymeric resin. In a preferred embodiment, the cross-linked polymeric resin of the present disclosure has an adsorption capacity in the range of 200-800 µg of heavy metal per g of the cross-linked polymeric resin, preferably 250-700 µg $g^{-1}$, preferably 300-650 µg $g^{-1}$, preferably 350-600 µg of heavy metal per g (total weight) of the polymeric resin.

In certain embodiments, up to 95% of the total mass of the heavy metal present in the aqueous solution is successfully removed from the aqueous solution at the end of the adsorption process following contacting, preferably up to 90%, preferably up to 89%, preferably up to 88%, preferably up to 87%, preferably up to 86%, preferably up to 85%, preferably up to 80%, preferably up to 75%, preferably up to 70%, preferably up to 65%, preferably up to 60%, preferably up to 55%, preferably up to 50%, preferably up to 45%, preferably up to 40%, preferably up to 35%, preferably up to 30%, preferably up to 25%. In a preferred embodiment, greater than 80% of the total mass of the heavy metal present in the aqueous solution is successfully removed from the aqueous solution at the end of the adsorption process following contacting, preferably greater than 85%, preferably greater than 90%, preferably greater than 92%, preferably greater than 94%, preferably greater than 96%, preferably greater than 98%, preferably greater than 99%.

In a preferred embodiment, each $R_1$, $R_2$, and $R_3$ is —H and n is 4 in the cross-linked polymeric resin of formula (I) and the aqueous solution comprises lead (II) and at least one additional heavy metal selected from the group consisting of Co, Cu, Zn, As, Sr, Mo, and Cd, and greater than 90% of the total mass of lead (II) is removed from the aqueous solution, preferably greater than 92%, preferably greater than 94%, preferably greater than 96%, preferably greater than 97%, preferably greater than 98% of the total mass of lead (II) is removed from the aqueous solution. In a preferred embodiment, each $R_1$, $R_2$, and $R_3$ is —H and n is 12 in the cross-linked polymeric resin of formula (I) and the aqueous solution comprises arsenic (V) and at least one additional heavy metal selected from the group consisting of Co, Cu, Zn, Pb, Sr, Mo, and Cd, and greater than 5% of the total mass of arsenic (V) is removed from the aqueous solution, preferably greater than 10%, preferably greater than 15%, preferably greater than 20%, preferably greater than 25% of the total mass of arsenic (V) is removed from the aqueous solution.

There are various parameters in the method under which heavy metal ions are removed from the aqueous solution. Parameters such as contact time, pH, temperature, and adsorbent dosages can be varied and their impacts on removal efficiency noted. In a preferred embodiment, the treatment and contacting process is carried out for 0.1 to 24 hours, preferably 0.25-12 hours, preferably 0.5-10 hours, preferably 1.0-8.0 hours, preferably 1.5-6.0 hours, preferably 2.0-5.0 hours, preferably 2.5-4.0 hours. The duration needs to be long enough to ensure sufficient contact time between adsorbent polymeric materials and heavy metal; however, if the process is left to run too long it's possible desorption may start to occur, resulting in bound heavy metal ions being released from the polymeric resin. In most instances, adsorption time requirements vary based on the nature of the interaction occurring between the adsorbent and the adsorbate. Generally, the adsorption by the polymeric resin of the heavy metal will increase with time, after which there is a slight and gradual decline in the adsorption. This is explained by the adsorption equilibrium phenomenon, in which the rate of adsorption is greater than the rate of desorption until equilibrium is reached at a certain contact time. At this time, the adsorption sites on the adsorbent may be saturated. Beyond this time, the rate of desorption is greater than the rate of adsorption, accounting for the slight and gradual decline in heavy metal ion adsorption beyond an optimum time. In one embodiment, greater than 90% of the total mass of the metal ion present in the aqueous solution is successfully removed from the aqueous solution within the first 10 hours of contacting, preferably within the first 5 hours, preferably within the first 2.5 hours, preferably within the first 2.0 hours, preferably within the first 1.0 hour of contacting.

In a preferred embodiment, the method for removing heavy metal is carried out at an aqueous solution pH range of 2.0-8.0, preferably 2.0-7.0, preferably 3.0-7.0, preferably 3.5-6.5, preferably 4.0-6.0, preferably 4.5-6.5. In certain embodiments, the cross-linked polymeric resin of the present disclosure is effective in adsorbing heavy metal ions in an aqueous solution within a temperature range of 10-100° C., preferably 20-80° C., preferably 25-60° C., preferably 25-40° C., preferably 25-30° C. or room temperature. In a preferred embodiment, the contacting is performed at a temperature in the range of 20-60° C., preferably 25-50° C., preferably 30-45° C., preferably 32-40° C., preferably 35-38° C.

In certain embodiments, the method further comprises agitation of the aqueous solution before, during or after the contacting. The agitation may encompass shaking, stirring, rotating, vibrating, sonication and other means of increasing contact between the adsorbent and the adsorbate. Further, the agitation can be performed by hand or mechanically. In one embodiment, the treatment and contacting process may be enhanced by mechanical shaking or agitation, preferably by a bath shaker at a speed of up to 300 rpm, preferably up to 250 rpm, preferably up to 200 rpm, preferably 50-200 rpm, preferably 75-175 rpm, preferably 100-150 rpm in order to increase contact between the adsorbent (cross-linked polymeric resin) and adsorbate (heavy metal ions). Adsorption is the key mechanism of removing heavy metals in the present disclosure; a requirement is contact between the adsorbent material and the target adsorbate. There is generally an increase in the removal efficiency with increasing agitation speed until a certain level. Any poor removal of heavy metal ions at lower agitation speeds may be attributable to a lack of contact between the active adsorption sites of the polymeric resin and the heavy metal ions as adsorbents may have settled in the vessel the method is carried out in.

In a preferred embodiment, the method further comprises recovering and reusing the heavy metal loaded cross-linked polymeric resin. In certain embodiments, the cross-linked polymeric resin may be removed and recovered from the aqueous solution with methods including, but not limited to, filtration, centrifugation, evaporation, heated evaporation and the like, preferably filtration or centrifugation, most preferably filtration. In certain embodiments, the separated and recovered heavy metal loaded cross-linked polymeric resin may be washed several types with an appropriate solvent to remove all materials present after each round of heavy metal absorption before being desorbed of the heavy metal and reused and/or recycled in another round of removal of heavy metal ions from aqueous solution.

In certain embodiments, the method may further comprise i) desorbing the heavy metal loaded cross-linked polymeric resin by treating with an acid to form a cross-linked polyamine terpolymer, ii) treating the cross-linked polyamine terpolymer with a base to reform the cross-linked polymeric resin and iii) reusing the cross-linked polymeric resin up to 15 times without a loss in adsorption capacity. In this manner the cross-linked polymeric resin can be recycled and/or reused in another contacting, adsorbing and removal. In a preferred embodiment, the cross-linked polymeric resin can be desorbed and reused up to 15 times without a loss in adsorption capacity, preferably up to 12 times, preferably up to 10 times, preferably up to 8 times, more preferably up to 5 times. In certain embodiments, the cross-linked polymeric resin of the present disclosure can be regenerated and reused as a heavy metal adsorbent for at least 5 cycles with minimal, if any, decrease in adsorption efficiency, no more than a 25% decrease in lead (II) or arsenic (V) removal with each regeneration cycle, preferably no more than a 20% decrease, preferably no more than a 15% decrease, preferably no more than a 10% decrease, preferably no more than a 5% decrease, preferably no more than a 2% decrease in lead (II) or arsenic (V) removal with each regeneration cycle.

In one embodiment, to regenerate the adsorbent, metal ions are desorbed from the cross-linked polymeric resin of formula (I) by treating or immersing the heavy metal loaded cross-linked polymeric resin in an acidic solution of 0.05-5.0 M in concentration, preferably 0.075-1.0 M, preferably 0.1-0.5 M in concentration for up to 48 hours, preferably up to 36 hours, preferably up to 24 hours, preferably up to 12 hours. Strong acids including, but not limited to, HCl, $H_2SO_4$, and $HNO_3$ are preferred, but organic acids and weak acids (i.e. acetic acid) may also be used in the desorption process, most preferably $HNO_3$. The cross-linked polymeric resin may be reformed by treating or immersing the cross-linked polyamine terpolymer in a basic solution of 0.05-5.0 M in concentration, preferably 0.075-1.0 M, preferably 0.1-0.5 M in concentration for up to 48 hours, preferably up to 36 hours, preferably up to 24 hours, preferably up to 12 hours. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a strong base, preferably and alkali metal hydroxide, most preferably sodium hydroxide (NaOH)

In one embodiment, the metal ion removal or adsorption process by the cross-linked polymeric resin is an endothermic process, as indicated by a determined positive ΔH value, preferably greater than 2 kJ/mol, preferably greater than 4 kJ/mol, preferably greater than 6 kJ/mol, preferably greater than 8 kJ/mol. In one embodiment, the metal ion removal or adsorption process by the cross-linked polymeric resin is a spontaneous process as indicated by a determined negative ΔG value, preferably −1 to −10 kJ/mol, preferably −2 to −8 kJ/mol, preferably −3 to −7 kJ/mol. In certain embodiments, the adsorption mechanism of heavy metal ion by the cross-linked polymeric resin described herein is best fit to a second order kinetic model. The intraparticle diffusion model describes the adsorption process in three consecutive steps: film diffusion (diffusion of metal ions through a liquid film surrounding the adsorbate), intraparticle diffusion (diffusion of polymer structures through the pores of the adsorbent), and finally mass action (the adsorption and desorption of metal ions between the active sites and adsorbate). In certain embodiments, the adsorption process may fit film diffusion and intraparticle diffusion, in other embodiments, the adsorption process may fit only film diffusion, or only intraparticle diffusion. In certain embodiments, the adsorption process is heterogeneous adsorption as modeled by a Freundlich isotherm. It is equally envisaged that the present disclosure may be adapted such that the adsorption process is monolayer as modeled by a Langmuir isotherm model. In certain embodiments, the adsorption has a low activation energy or potential barrier, preferably less than 20 kJ/mol, preferably less than 10 kJ/mol, preferably less than 5 kJ/mol, preferably less than 2 kJ/mol, preferably less than 1 kJ/mol. The low activation energy indicates that the adsorption process is favorable and may be predominantly physisorption or electrostatic attraction rather than chemisorption. The physisorption process is readily reversible, equilibrium is attained rapidly and thus the energy requirements are small (i.e. <40 kJ/mol). The chemisorption mechanism is specific and involves stronger forces, and thus requires larger activation energy (i.e. >40 kJ/mol).

The examples below are intended to further illustrate methods protocols for preparing and characterizing the cross-linked polymeric resins of the present disclosure. Further, they are intended to illustrate assessing the properties of these compounds. They are not intended to limit the scope of the claims.

Example 1

General Materials and Methods of Characterization for Prepared Cross-Linked Terpolymers Aniline (An), paraformaldehyde, 1,4-diaminobutane (Buta), 1,6-diaminohexane (Hexa), 1,8-diminooctane (Octa), 1,10-diaminodecane (Deca), and 1,12-diaminododecane (Dodeca) from Fluka Chemie AG (Buchs, Switzerland) and used as received without any further purification. All solvents and reagents used were of analytical grade.

Elemental analysis was carried out on a Perkin-Elmer Elemental Analyzer Series II Model 2400. Infrared spectra were recorded on a Perkin-Elmer 16F PC FTIR spectrometer using KBr pellets in the 500-4000 $cm^{-1}$ region. Solid state $^{13}C$-NMR spectra were recorded on a Bruker WB-400 spectrometer with an operating frequency at 100.61 MHz (9.40 T). Samples were packed into 4 mm zirconium oxide rotors at 25° C. Cross polarization was employed. A contact time of 2 ms and a pulse delay of 5.0 s were used in the cross polarization magic angle spinning (CP-MAS) experiments. The magic angle spinning rate was 4 KHz. Carbon chemical shifts were referenced to tetramethylsilane using the high frequency isotropic peak of adamantine at 38.56 ppm.

Scanning electron microscopy images were taken by a TESCAN LYRA 3 (Czech Republic) instrument equipped with an energy dispersive X-ray spectroscopy (EDX) detector model X-Max. Inductively coupled plasma mass spectroscopy (ICP-MS) analysis was performed using an ICP-MS XSERIES-11 (Thermo Scientific) instrument. Thermogravimetric analysis (TGA) was performed using a thermal analyzer (STA 429) by Netzsch (Germany). The experiment was performed in a nitrogen atmosphere from 20-800° C. with a heating rate of 10° C./min and a nitrogen flow rate of 20 mL/min. X-ray analysis was on performed on a Rigaku Rint D/Max-2500 diffractometer instrument using CuKα radiation (wave length=1.5418 Å) in a scanning range of 2θ=5-50°. The scanning step was 0.03 with a scanning speed of 3° per minute.

Example 2

Synthesis of Cross-Linked Terpolymers

The cross-linked terpolymers or polyamines were synthesized as outlined in FIG. 1. The cross-linked terpolymers were prepared by mixing 0.01 mol of aniline, 0.03 mol of diaminoalkane, and 0.06 mol of paraformaldehyde in 30 mL of n-heptane as the reaction medium solvent. The mixture was stirred using a magnetic stirrer. The reaction temperature was increased slowly to 90° C. and kept there for 24 hours with continuous stirring. Once the reaction components were mixed and as the temperature reached 60° C., a white resinous material formed that was left overnight at 90° C. to cure. After 24 hours of mixing and upon completion of the reaction, the resinous material was filtered off, crushed, and soaked/stirred in distilled water for 24 hours. The product resin was then filtered and dried under vacuum at 60° C. until a constant weight was achieved.

The resulting terpolymers were treated with NaOH in order to insure the absence of quaternary ammonium ions that could decrease the ability of the terpolymers in the removal of toxic metal ions. The resulting polyamines were basified according to the following procedure. Approximately, 0.01 mol of polyamine was treated with 0.07 mol of sodium hydroxide in 50 mL of distilled water for 24 hours. The resulting polymer was filtered and washed several times with distilled water. The polymer obtained was dried under vacuum at 60° C. until a constant weight was achieved. Table 1 summarizes the elemental analysis of the prepared terpolymers. The aniline-formaldehyde-alkyldiamine terpolymer series was labelled as An-Buta, An-Hexa, An-Octa, An-Deca, and An-Dodeca. The hardness of the synthesized terpolymers varied from hard to a rubbery-like material, which could be explained based on the length of the aliphatic chain of the diaminoalkane. The 1,4-diaminobutane based cross-linked terpolymer showed one of the harder resins. Whereas, the 1,12-diaminododecane based resin showed a rubbery-like material, the larger ratio of alkyl functionality to aromatic functionality led to more rubbery like cross-linked terpolymers. During the reaction, the cross-linked terpolymers based on long alkyl chains formed spherical pellets compared with shorter alkyl chain terpolymers that formed a single large lump [S. G. Subramaniapillai, Mannich reaction: A versatile and convenient approach to bioactive skeletons, J. Chem. Sci. (Bangalore, India), 125 (2013) 467-482.—incorporated herein by reference in its entirety].

TABLE 1

Summary of elemental analysis of polyamines prepared by Mannich condensation terpolymerization[a] of aniline-formaldehyde-alkyldiamine terpolymers

| | | Elemental analysis | | | | | |
|---|---|---|---|---|---|---|---|
| | | Calculated (%) | | | Observed (%) | | |
| Terpolymer | Yield (%)[b] | C | H | N | C | H | N |
| An-Buta | 44.98 | 65.99 | 10.59 | 23.42 | 65.78 | 10.67 | 23.26 |
| An-Hexa | 69.49 | 69.27 | 11.23 | 19.50 | 69.57 | 11.45 | 19.23 |
| An-Octa | 75.01 | 72.21 | 12.28 | 15.51 | 71.24 | 12.15 | 15.85 |

TABLE 1-continued

Summary of elemental analysis of polyamines prepared by Mannich condensation terpolymerization[a] of aniline-formaldehyde-alkyldiamine terpolymers

| Terpolymer | Yield (%)[b] | Calculated (%) | | | Observed (%) | | |
|---|---|---|---|---|---|---|---|
| | | C | H | N | C | H | N |
| An-Deca | 76.60 | 73.38 | 12.02 | 14.61 | 73.25 | 12.16 | 14.61 |
| An-Dodeca | 80.10 | 74.74 | 12.28 | 12.98 | 74.64 | 12.29 | 13.11 |

[a]Polymerization reactions were carried out using 0.01 mol of phenol, 0.03 mol of alkyldiamine, and 0.06 mol of paraformaldehyde in 30 mL n-heptane at 90° C. for 24 hours
[b]Yield (%) = (mass of product/mass of reactants) × 100%

Example 3

Figure 2:
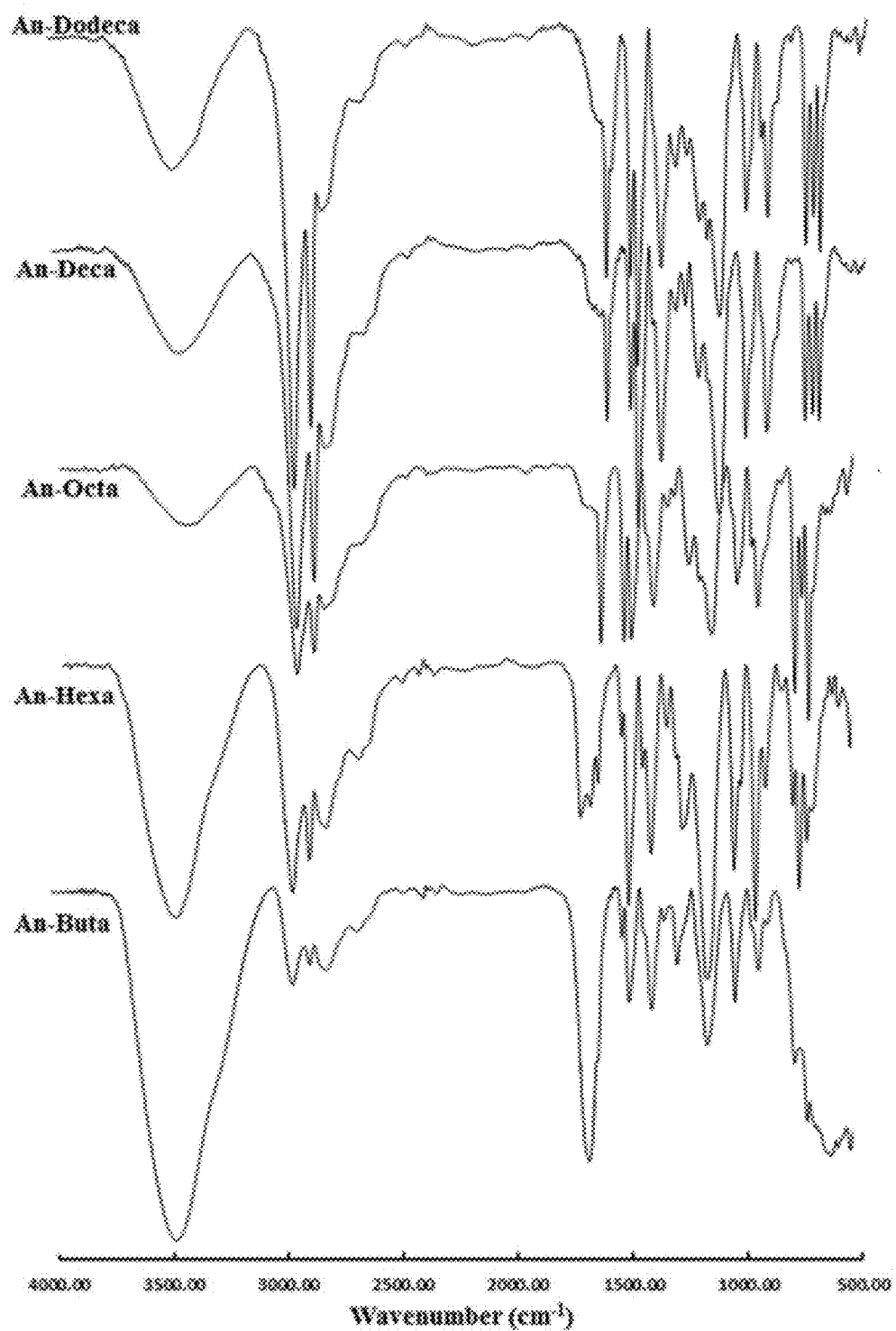
FIG. 2 is a Fourier transform infrared (FT-IR) spectroscopy analysis of a series of polyamine cross-linked polymeric resins of formula (1) wherein $R_1$ is —H and n=4, 6, 8, 10 or 12.

Fourier Transform Infrared (FT-1R) Spectroscopy and Solid State $^{13}$C-NMR Characterization of the Prepared Cross-Linked Terpolymer Series FIG. 2 presents the Fourier transform infrared (FT-IR) spectra for the synthesized terpolymers. The spectra of the five terpolymers (An-Buta, An-Hexa, An-Octa, An-Deca, and An-Dodeca) are consistent with the proposed structure as given in FIG. 1. The spectra show a broad band at ~3425 cm$^{-1}$ which is assigned to the intermolecular hydrogen bonding and the stretching vibration of —NH groups [S. Cavus, G. Gurdag, Noncompetitive removal of heavy metal ions from aqueous solutions by poly[2-(acrylamido)-2-methyl-1-propanesulfonic acid-co-itaconic acid] hydrogel, Ind. Eng. Chem. Res., 48 (2009) 2652-2658.—incorporated herein by reference in its entirety]. A sharp band at ~1640 cm$^{-1}$ is assigned to the asymmetric —NH bending vibration. Two sharp and strong bands at ~1600 cm$^{-1}$ and ~1467 cm$^{-1}$ are assigned to the C=C aromatic ring stretching vibration while the strong sharp bands at ~1115 cm$^{-1}$ and ~750 cm$^{-1}$ are assigned to the C—N stretching vibration and N—H wag vibration respectively. The strong sharp band at ~720 cm$^{-1}$ is assigned to the CH$_2$ rock which indicates a long chain of CH$_2$ which is consistent with the long aliphatic chains of the diaminoalkanes. Sharp and intense bands at ~2925 cm$^{-1}$ and ~2855 cm$^{-1}$ are assigned to C—H asymmetric and symmetric stretching vibrations respectively, whose relative intensities to the broad —NH$_2$ band at 3425 cm$^{-1}$ increases with the increasing aliphatic chain length of the diaminoalkanes [R. S. Azarudeen, R. Subha, D. Jeyakumar, A. R. Burkanudeen, Batch separation studies for the removal of heavy metal ions using a chelating terpolymer: Synthesis, characterization and isotherm models, Sep. Purif Technol., 116 (2013) 366-377.; and L. J. Bellamy, The Infrared Spectra of Complex Molecules. 3rd Ed, Chapman and Hall, London, 1975.; and B. H. Stuart, Infrared Spectroscopy-Fundamentals and Applications, John Wiley & Sons, Chichester, West Sussex, 2004.—each incorporated herein by reference in its entirety].

Figure 3:
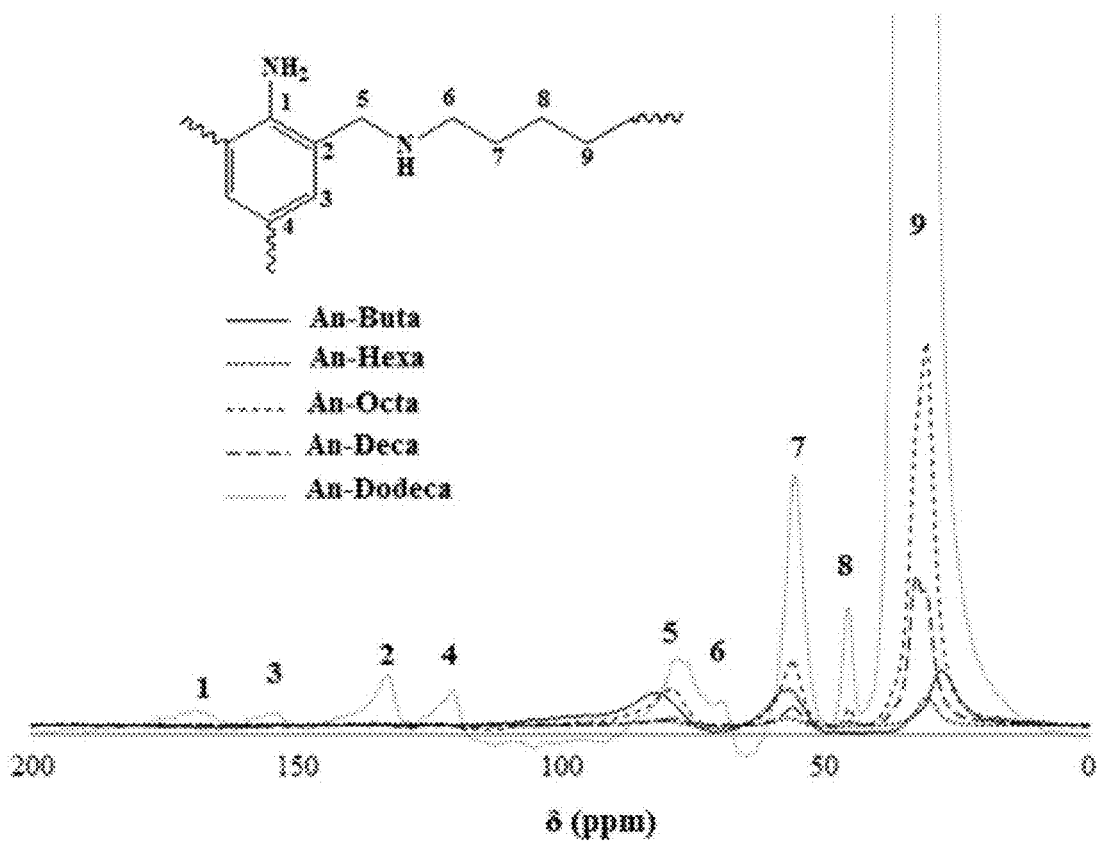
FIG. 3 is the solid state $^{13}C$ nuclear magnetic resonance (NMR) spectra of a series of polyamine cross-linked polymeric resins of formula (I) wherein $R_1$ is —H and n=4, 6, 8, 10 or 12.

Solid state $^{13}$C nuclear magnetic resonance (NMR) is considered a powerful technique for the characterization of cross-linked polymers as they are insoluble in any solvent [R. Rego, P. J. Adriaensens, R. A. Carleer, J. M. Gelan, Fully quantitative carbon-13 NMR characterization of resol phenol-formaldehyde prepolymer resins, Polymer, 45 (2004) 33-38.; and A. Georgakopoulos, Aspects of solid state 13C CPMAS NMR spectroscopy in coals from the Balkan Peninsula, J. Serb. Chem. Soc., 68 (2003) 599-605.; and I. S. Chuang, G. E. Maciel, G. E. Myers, Carbon-13 NMR study of curing in furfuryl alcohol resins, Macromolecules, 17 (1984) 1087-1090.—each incorporated herein by reference in its entirety]. FIG. 3 shows the $^{13}$C-NMR combined spectra. Similar peaks are found to represent the structure of the five synthesized cross-linked terpolymers, but a difference in the intensity of the aliphatic methylene chain (without the methylene units attached to the amino group) of the diaminoalkane is noted; as the number of methylene units increases the intensity of the peak at ~30 ppm increases. The $^{13}$C-NMR spectra confirm the structure of the proposed synthesized cross-linked terpolymers.

Example 4

Figure 4:
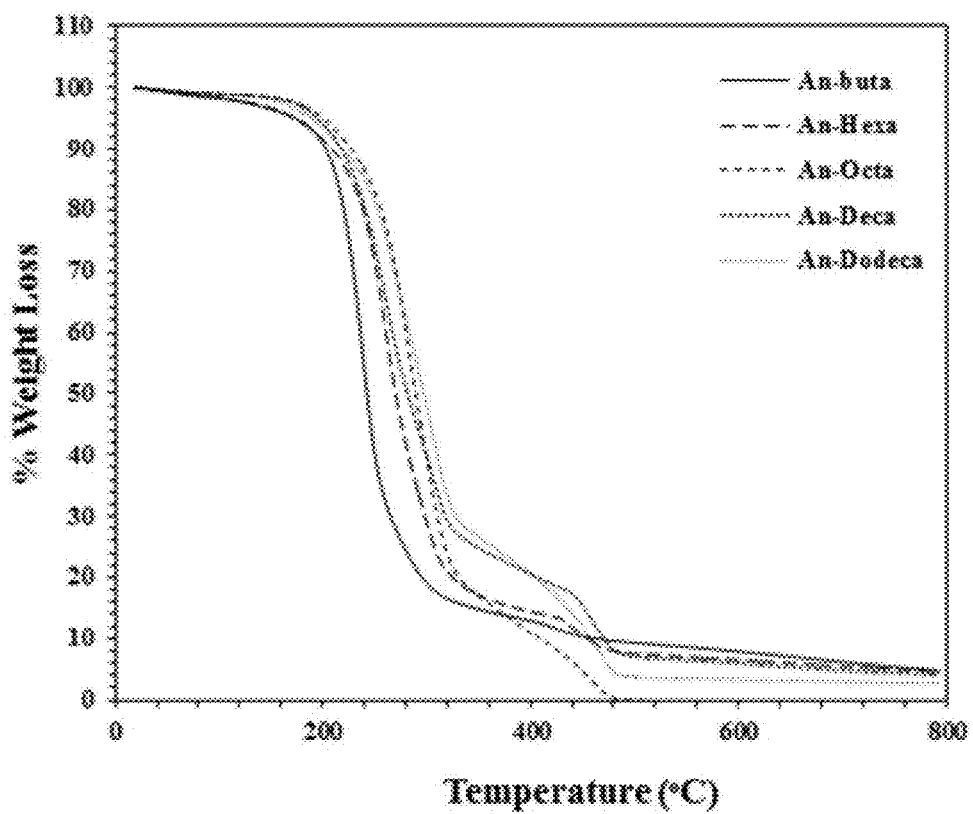
FIG. 4 is a thermal gravimetric analysis (TGA) of a series of polyamine cross-linked polymeric resins of formula (I) wherein $R_1$ is —H and n=4, 6, 8, 10 or 12.
Figure 5:
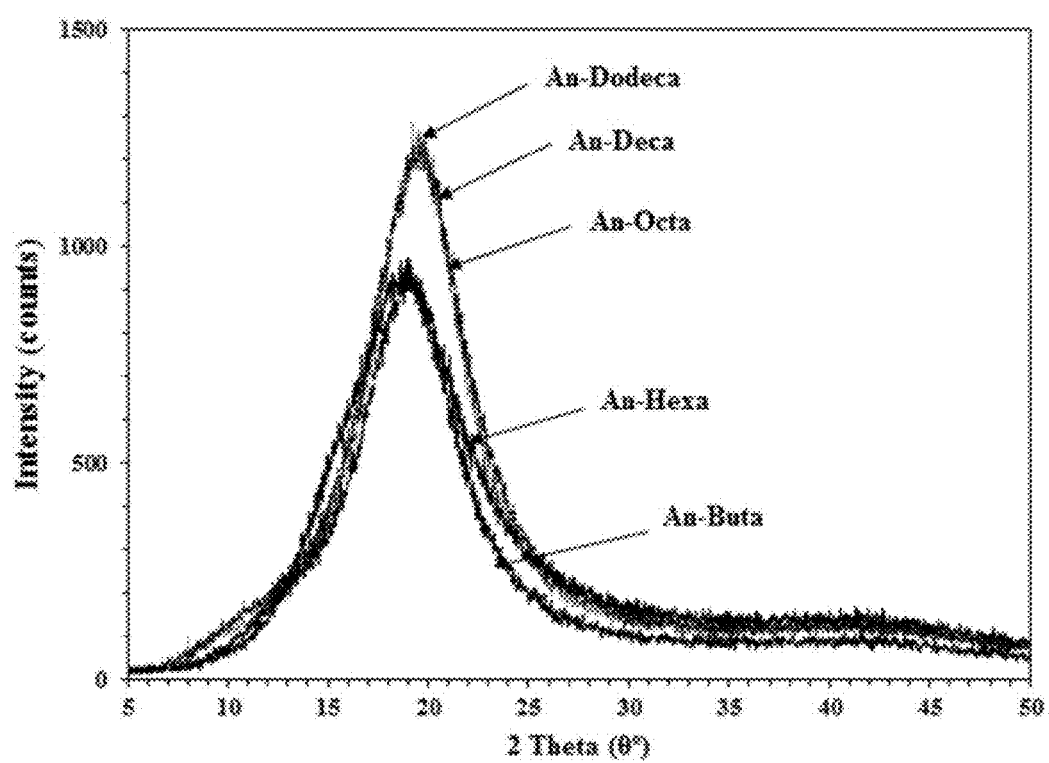
FIG. 5 is the powder X-ray diffraction (PXRD) spectra of a series of polyamine cross-linked polymeric resins of formula (I) wherein $R_1$ is —H and n=4, 6, 8, 10 or 12.

Powder X-Ray Diffraction (PXRD) Spectroscopy and Thermogravimetric Analysis (TGA) Characterization of the Prepared Cross-Linked Terpolymer Series Elemental analysis of the synthesized terpolymers was in agreement with the proposed terpolymer structures (Table 1). As the chain length increases the structure adds three CH$_2$ units, increasing the percentage (%) of carbon and decreasing the percentage (%) of nitrogen in the polymer monomer unit. FIG. 4 shows the results of a thermogravimetric analysis (TGA) carried out in order to evaluate the thermal stability of the synthesized terpolymers. The thermogram shows three major degradation patterns. The initial degradation (~0-7%) at 0° C. to 180° C. is due to the loss of water molecules strongly held within the terpolymer network by intermolecular hydrogen bonds. This indicates the high hydrophilicity of An-Buta and An-Hexa, whereas the An-Octa, An-Deca, and An-Dodeca thermograms show an absence of water molecules due to the higher hydrophobicity. There is a subsequent sharp weight loss (~70%) at ~180° C. to 400° C. due to the thermal degradation of the aliphatic chain. Finally, a gradual weight loss (~15%) at ~400° C. to 800° C. is due to carbonization or pyrolysis of the aromatic moieties [I. Muylaert, A. Verberckmoes, J. De Decker, P. Van Der Voort, Ordered mesoporous phenolic resins: Highly versatile and ultra-stable support materials, Advances in Colloid and Interface Science, 175 (2012) 39-51.—incorporated herein by reference in its entirety]. FIG. 5 show the powder X-ray diffraction (PXRD) spectroscopy patterns revealing the presence of a 2θ peak at ~20°. Additionally, an increase in the chain length of the diaminoalkane present in the terpolymer showed enhanced crystallinity of the synthesized terpolymer. As FIG. 5 shows, the crystallinity increased as the chain length increased, where longer methylene chains allowed better packing of the chains leading to enhanced crystallinity [J. Blackwell, M. R. Nagarajan, T. B. Hoitink, Structure of polyurethane elastomers: effect of chain extender length on the structure of MDI/diol hard segments, Polymer, 23 (1982) 950-956.—incorporated herein by reference in its entirety].

Example 5

Adsorption Experiments

Adsorption experiments of the synthesized cross-linked terpolymers were performed via two steps. First, 0.03 g of each terpolymer was stirred for 24 hours in 20 mL of a solution containing 1 mg L$^{-1}$ Pb(NO$_3$)$_2$ to distinguish the best adsorbent of the synthesized terpolymers. Secondly, further studies were performed for the removal of lead (II) ions via a fashion similar to an earlier study of polyphosphonate polymers for the removal of lead and copper from an aqueous solution [O. C. S. Al Hamouz, S. A. Ali, Novel Cross-Linked Polyphosphonate for the Removal of Pb2+ and Cu2+ from Aqueous Solution, Ind Eng Chem Res, 51

(2012) 14178-14187.—incorporated herein by reference in its entirety]. In this manner for An-Buta, a mixture of 0.03 g of terpolymer in a 20 mL Pb(NO$_3$)$_2$ solution of desired pH was stirred for 24 hours. The terpolymer was then filtered and washed with deionized water. The amount of lead (II) ions in the filtrate was analyzed by inductively coupled plasma mass spectroscopy (TCP-MS). The adsorption capacity (q$_e$) in mmol g$^{-1}$ can be determined by the equation of formula (VII).

$$q_e = \frac{(C_0 - C_f)V}{W} \quad \text{(VII)}$$

In this equation, C$_0$ and C$_f$ are initial and final concentrations respectively of lead (II) ions in mmol L$^{-1}$, W is the weight of the dried terpolymer in grams (g), and V is the volume of the solution in liters (L). The results obtained represent the average of three runs and varied by less than 5%. The adsorption isotherms were constructed by changing the concentration of lead (II) ions from 0.2-1.0 mg L$^{-1}$ at pH 6 and a temperature of 25° C. for 24 hours. For adsorption kinetics, An-Buta was immersed in 20 mL of 1.0 mg L$^{-1}$ solutions of lead (II) ions for different times at pH 6. A similar procedure was performed for the removal of arsenic (V) by the synthesized polyamines from 1.0 mg L$^{-1}$ solutions of H$_3$AsO$_4$.

Figure 6:
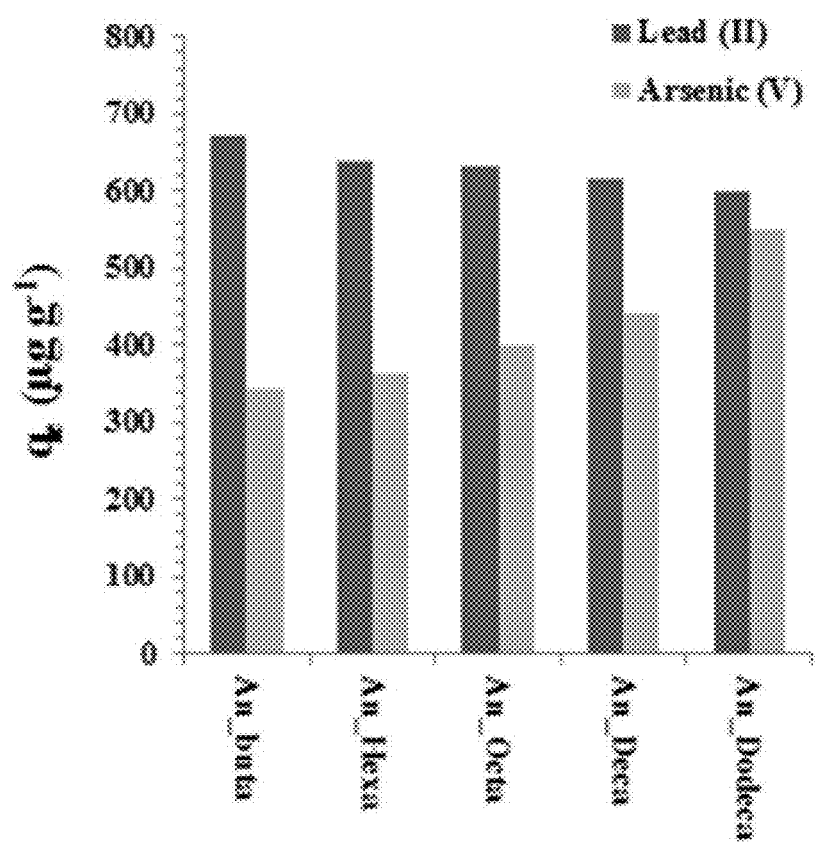
FIG. 6 is a bar graph chart illustrating the relationship between alkyl chain length of a series of polyamine cross-linked polymeric resins of formula (I) wherein $R_1$ is —H and n=4, 6, 8, 10 or 12 and lead (II) and arsenic (V) adsorption capacity.

The main functionality responsible for the adsorption of lead (II) and arsenic (V) ions in the synthesized cross-linked terpolymers is the primary and secondary amino groups (—NH— and —NH$_2$—). The presence of one lone pair on the nitrogen atom with the high electronegativity possessed by the nitrogen atom (nitrogen=3.0) provides a high electrostatic attraction between the positive lead (II) ions and the synthesized cross-linked terpolymers. In contrast, arsenic (V) ions that are found in the form of H$_3$AsO$_4$ showed repulsion, due to a similar negative charge. Another factor is the length of the aliphatic alkyl chain of the alkyldiamine monomer. In studies where 30 mg of each cross-linked terpolymer was immersed in 20 mL of a 1 mg L$^{-1}$ solution of Lead (II) and/or arsenic (V) and stirred for 24 hours and filtered, the concentration of the solution was measured before and after adsorption. FIG. 6 shows that as the chain length of the diaminoalkane increases the adsorption capacity decrease in the adsorption of lead (II) ions, which may be attributed to repulsion between the long hydrophobic entangle methylene chains (—(CH2)$_n$—) and the hydrophilic hydration shell of lead (II) ions. An-Deca and An-Dodeca shows an uptick increase in adsorption capacity of lead (II) ions, which may be attributed to an increase in pore size of the synthesized terpolymers. In contrast, in the adsorption of arsenic (V), as the chain length increases, the adsorption capacity increases, this may be attributed to reduced repulsion between the amino groups and the negative arsenic (V). Additionally, the major factor for the increase in the adsorption capacity of arsenic (V) could be attributed to the increase in the pore size as the chain length of the aliphatic moiety of the alkyldiamine monomer increases. Further studies were performed on An-Buta and An-Dodeca due to their higher efficiency in the removal of lead (II) ions and arsenic (V) ions, respectively.

Figure 7:
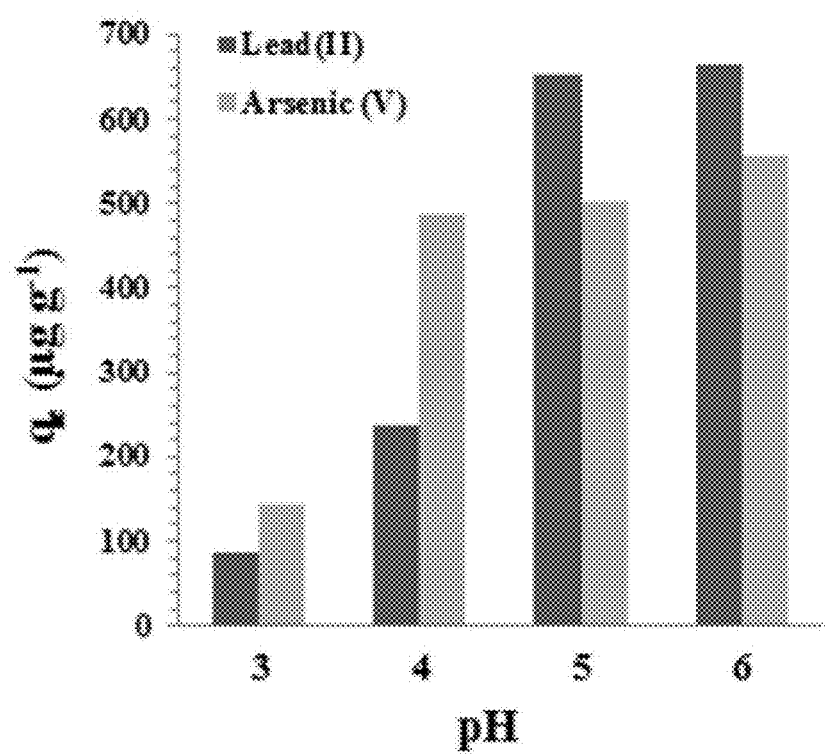
FIG. 7 is a bar graph chart illustrating the effect of pH of an aqueous solution on the lead (II) and arsenic (V) adsorption capacity of a polyamine cross-linked polymeric resin of formula (I) wherein $R_1$ is —H and n=12 (An-Dodeca).

FIG. 7 shows the effect of pH on the adsorption capacity of the An-Dodeca terpolymer revealing an increase in adsorption capacity as the pH value is increased. The effect of pH is an important factor in the adsorption of heavy metals as H$^+$ is competing for the adsorption sites in the synthesized cross-linked terpolymers. Another factor is metal speciation, where at pH values above 6 lead ions precipitate forming lead hydroxide precipitates [A. A. Mengistie, T. S. Rao, A. V. P. Rao, M. Singanan, Removal of lead(II) ions from aqueous solutions using activated carbon from Militia ferruginea plant leaves, Bull. Chem. Soc. Ethiop., 22 (2008) 349-360.; and P. X. Sheng, Y.-P. Ting, J. P. Chen, L. Hong, Sorption of lead, copper, cadmium, zinc, and nickel by marine algal biomass: characterization of biosorptive capacity and investigation of mechanisms, J. Colloid Interface Sci., 275 (2004) 131-141.—each incorporated herein by reference in its entirety]. At low pH values, the positive ammonium ion (—NH$_2^-$—) predominates leading to electrostatic repulsions with positive lead ions. However, higher pH values decreases the amount of positive H$^-$ and increases the negative charge on the surface of the cross-linked terpolymer leading to higher electrostatic attraction with lead (II) ions. In contrast, the adsorption of arsenic (V) by An-Dodeca increased with the increase of pH value, arsenic exists as H$_2$AsO$_4^{1-}$ in the pH range of 2.1 to 6.9 [S. Yao, Z. Liu, Z. Shi, Arsenic removal from aqueous solutions by adsorption onto iron oxide/activated carbon magnetic composite, J Environ Health Sci Eng, 12 (2014) 58.; and R.-M. Couture, P. Van Cappellen, Reassessing the role of sulfur geochemistry on arsenic speciation in reducing environments, J Hazard Mater, 189 (2011) 647-652.; and S. Kumar, R. R. Nair, P. B. Pillai, S. N. Gupta, M. A. R. Iyengar, A. K. Sood, Graphene Oxide—MnFe2O4 Magnetic Nanohybrids for Efficient Removal of Lead and Arsenic from Water, ACS Applied Materials & Interfaces, 6 (2014) 17426-17436.—each incorporated by reference in its entirety]. This may be attributed to the larger pore size in An-Dodeca, and the smaller ratio of amine groups to aliphatic hydrophobic alkyl chains, which allows arsenic to diffuse into the terpolymer.

Example 6

Effect of Initial Concentration and Isotherm Model Studies

Figure 8:
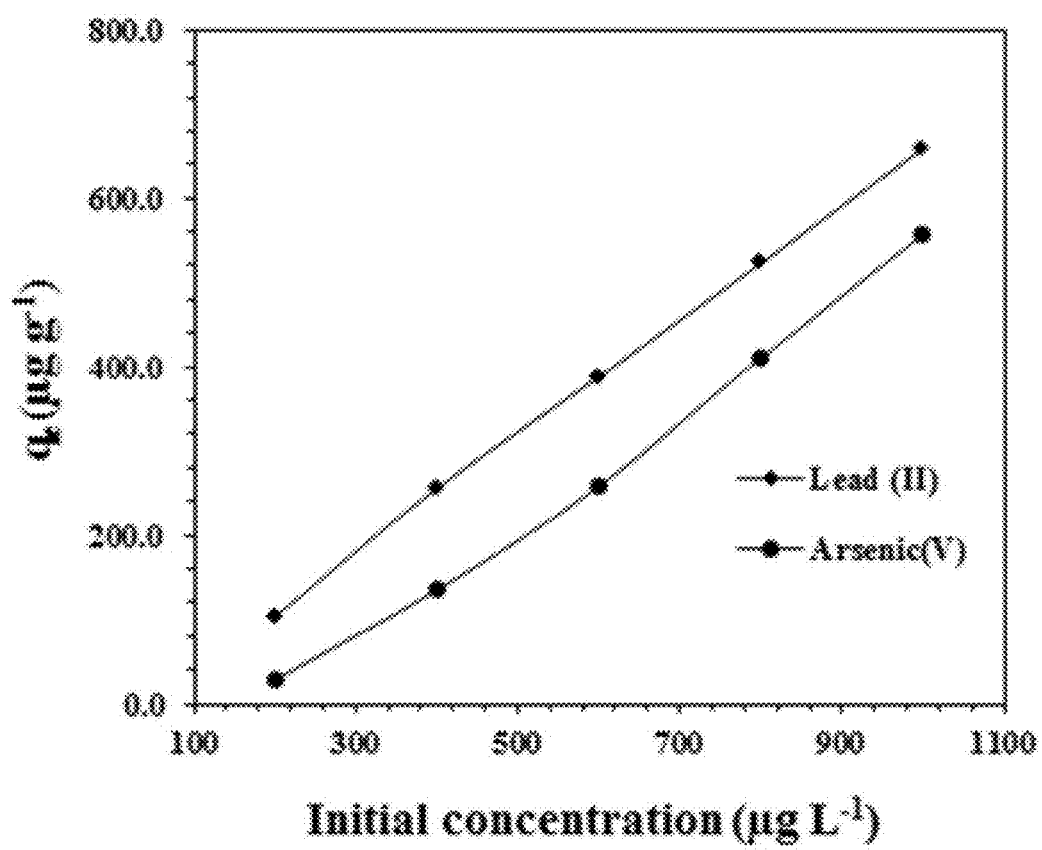
FIG. 8 is a plot illustrating the relationship between initial concentration of lead (II) ions or arsenic (V) ions and the adsorption capacity of a cross-linked polymeric resin of formula (I) wherein $R_1$ is —H and n is 4 (An-Buta) or n is 12 (An-Dodeca).

The adsorption isotherms were constructed by changing the concentration of lead (II) ions from 0.2-1.0 mg L$^{-1}$ at pH 6 and a temperature of 25° C. for 24 hours. For adsorption kinetics, An-Buta was immersed in 20 mL of 1.0 mg L$^{-1}$ solutions of lead (II) ions for different times at pH 6. A similar procedure was performed for arsenic (V) by An-Dodeca with solutions of H$_3$AsO$_4$. The effect of initial concentration was studied at pH=6 on solutions of lead (II) and arsenic (V) ions with an initial concentration (C$_0$) ranging between 0.2 and 1.0 mg L$^{-1}$. Table 2 summarizes the effect of initial concentration on the adsorption capacities of the synthesized cross-linked terpolymers. FIG. 8 shows the effect of initial concentration of the adsorption capacities of the synthesized cross-linked terpolymers. FIG. 8 shows an increase in the adsorption capacity with the increase of the initial concentration. Table 2 reveals an increase in percentage (%) removal of up to 99% at 1 mg L$^{-1}$ for lead (II) ions and up to 85% removal of arsenic (V) ions.

TABLE 2

Effect of initial concentration (C$_0$, µg L$^{-1}$) on percent removal (%) of lead (II) and arsenic (V) ions by An-Buta and An-Dodeca terpolymers

| Polymer | Metal | Initial Concentration, C$_0$ (µg L$^{-1}$) | q$_e$ (µg g$^{-1}$) | Percent Removal (%) |
|---------|-------|---------|---------|---------|
| An-Buta | Lead (II) | 200 | 103.3 | 78 |
|  |  | 400 | 255.6 | 96 |
|  |  | 600 | 388.0 | 97 |

TABLE 2-continued

Effect of initial concentration ($C_0$, µg $L^{-1}$) on percent removal (%) of lead (II) and arsenic (V) ions by An-Buta and An-Dodeca terpolymers

| Polymer | Metal | Initial Concentration, $C_0$ (µg $L^{-1}$) | $q_e$ (µg $g^{-1}$) | Percent Removal (%) |
|---|---|---|---|---|
| | | 800 | 523.0 | 98 |
| | | 1000 | 658.7 | 99 |
| An-Dodeca | Arsenic (V) | 200 | 28.0 | 19 |
| | | 400 | 135.0 | 36 |
| | | 600 | 258.0 | 55 |
| | | 800 | 410.8 | 77 |
| | | 1000 | 557.0 | 84 |

In order to evaluate and explain the adsorption process three adsorption isotherms were applied: Langmuir, Freundlich and Dubinin-Kaganer-Radushkevich (DKR). The Langmuir adsorption isotherm model is utilized to describe homogeneous adsorption of metal ions on the surface of an adsorbent, and each metal ion is adsorbed by one active site. The linear form of the Langmuir isotherm model can be expressed by formula (VIII).

$$\frac{C_e}{q_e} = \frac{C_e}{Q_m} + \frac{1}{Q_m b} \tag{VIII}$$

Figure 9:
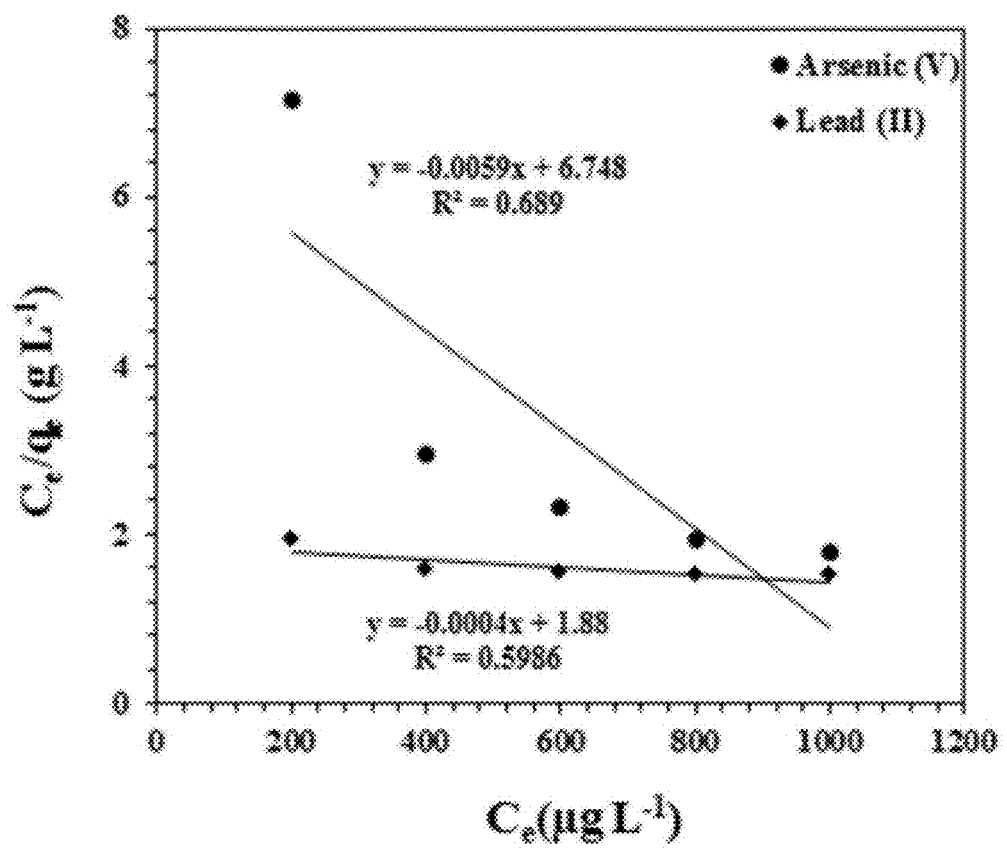
FIG. 9 is a Langmuir adsorption isotherm for lead (II) or arsenic (V) adsorption by a cross-linked polymeric resin of formula (I) wherein $R_1$ is —H and n is 4 (An-Buta) or n is 12 (An-Dodeca).

In this formula, $C_e$ and $q_e$ are the concentration (µg $L^{-1}$) and adsorption capacity (µg $g^{-1}$) at equilibrium, respectively. $Q_m$ is the maximum adsorption capacity (µg $g^{-1}$), and b is the Langmuir constant ($L^3$ µg$^{-1}$) related to adsorption energy. $Q_m$ and b can be calculated from the slope and intercept from a linearized plot of $C_e/q_e$ versus Ce. FIG. 9 shows this linearized plot. This model assumes that the adsorption process is homogeneous with uniform energy as all active sties possess equal affinity to metal ions [K. Vijayaraghavan, T. V. N. Padmesh, K. Palanivelu, M. Velan, Biosorption of nickel(II) ions onto *Sargassum wightii*: Application of two-parameter and three-parameter isotherm models, J. Hazard. Mater., 133 (2006) 304-308.; and S. Kundu, A. K. Gupta, Arsenic adsorption onto iron oxide-coated cement (IOCC): Regression analysis of equilibrium data with several isotherm models and their optimization, Chem. Eng. J. (Amsterdam, Neth.), 122 (2006) 93-106.—each incorporated herein by reference in its entirety]. Table 3 shows that negative Langmuir constants and poor regression values ($R^2$) were obtained. These negative values conclude that the Langmuir model is unfit in explaining the adsorption process of lead (II) and arsenic (V) by An-Buta and An-Dodeca, respectively.

TABLE 3

Langmuir, Freundlich, and DKR isotherm model constants for the adsorption of lead (II) and arsenic (V) ions by An-Buta and An-Dodeca terpolymers

| | | Langmuir isotherm model | | |
|---|---|---|---|---|
| Polymer | Metal ion | $Q_m$ | b | $R^2$ |
| An-Buta | Lead (II) | −2500 | −0.0002 | 0.5986 |
| An-Dodeca | Arsenic (V) | −169.5 | −0.0398 | 0.6890 |
| | | Freundlich isotherm model | | |
| | | $k_f$ | 1/n | $R^2$ |
| An-Buta | Lead (II) | 0.2500 | 1.145 | 0.9961 |
| An-Dodeca | Arsenic (V) | 0.0017 | 1.856 | 0.9894 |

TABLE 3-continued

Langmuir, Freundlich, and DKR isotherm model constants for the adsorption of lead (II) and arsenic (V) ions by An-Buta and An-Dodeca terpolymers

| | | DKR isotherm model | | | |
|---|---|---|---|---|---|
| | | β | $q_m$ | E | $R^2$ |
| An-Buta | Lead (II) | 0.0112 | 535.0 | 6.682 | 0.9054 |
| An-Dodeca | Arsenic (V) | 0.0185 | 426.5 | 5.199 | 0.9279 |

As opposed to the Langmuir isotherm model, the Freundlich isotherm model describes the adsorption on a heterogeneous surface. The linear form of the Freundlich isotherm model can be represented by formula (IX).

$$\log q_e = \log k_f + \frac{1}{n} \log C_e \tag{IX}$$

Figure 10:
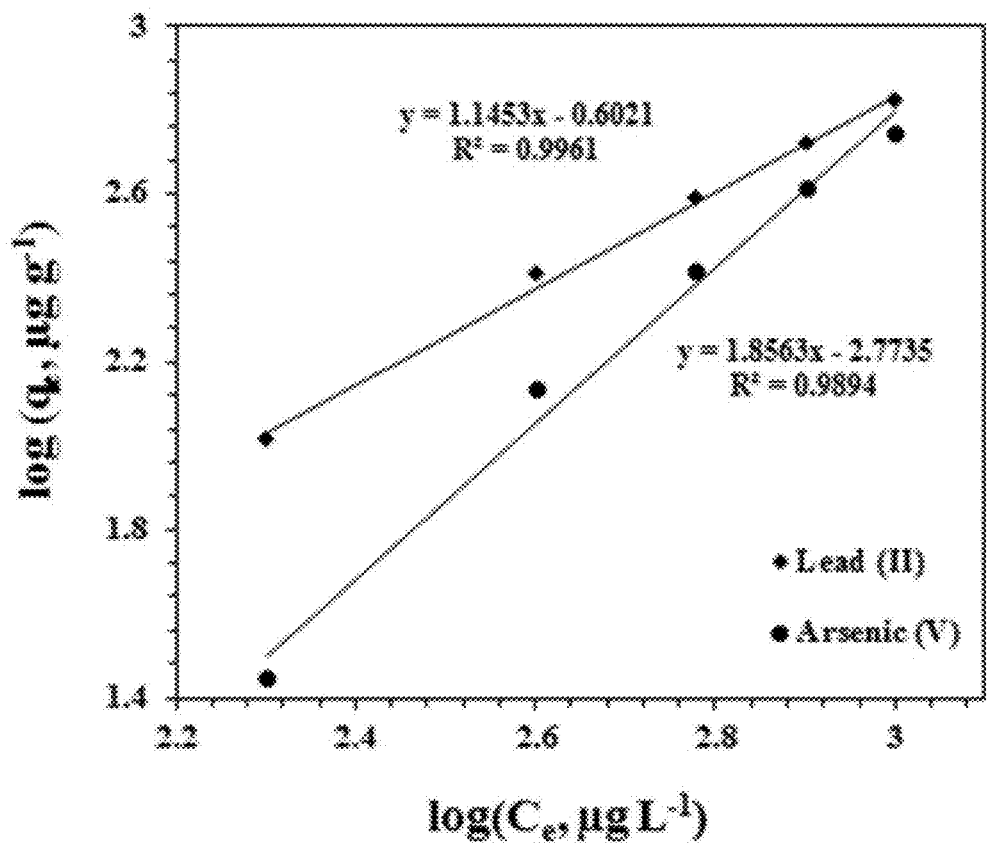
FIG. 10 is a Freundlich adsorption isotherm for lead (II) or arsenic (V) adsorption by a cross-linked polymeric resin of formula (I) wherein $R_1$ is —H and n is 4 (An-Buta) or n is 12 (An-Dodeca).

In this formula, $k_f$ and n are Freundlich constants and can be elucidated and calculated from the slope and intercept of the linear plot of log $q_e$ versus log $C_e$ [A. F. Shaaban, D. A. Fadel, A. A. Mahmoud, M. A. Elkomy, S. M. Elbahy, Synthesis of a new chelating resin bearing amidoxime group for adsorption of Cu(II), Ni(II) and Pb(II) by batch and fixed-bed column methods, J. Environ. Chem. Eng., 2 (2014) 632-641.; and S. Mandavi, M. Jalali, A. Afkhami, Heavy metals removal from aqueous solutions using TiO2, MgO, and Al2O3 nanoparticles, Chem. Eng. Commun., 200 (2013) 448-470.—each incorporated herein by reference in its entirety]. FIG. 10 shows this linearized plot. Table 3 shows the values found for these constants. The slope (1/n) measures the heterogeneity of the surface, where a value closer to zero is an indication of higher heterogeneity. A value of 1/n lower than one indicates favorable adsorption and a value of 1/n above one is an indication of cooperative adsorption. Table 3 shows that the 1/n values are above one which indicates that the adsorption of lead (II) and arsenic (V) is cooperative adsorption. The $k_f$ value reflects the binding affinity of lead and arsenic to the polyamine; higher $k_f$ values indicate more effective binding. Table 3 shows that the binding affinity of lead (II) ions is larger to An-Buta in comparison to arsenic (V) ions to An-Dodeca. This may be attributed to the higher electrostatic attraction between An-Buta and positive lead (II) ions. In contrast, the lower binding affinity of arsenic (V) to An-Dodeca may be attributed to the electrostatic repulsion between An-Dodeca and the negative arsenic (V) species ($H_2ASO_4^-$).

Figure 11:
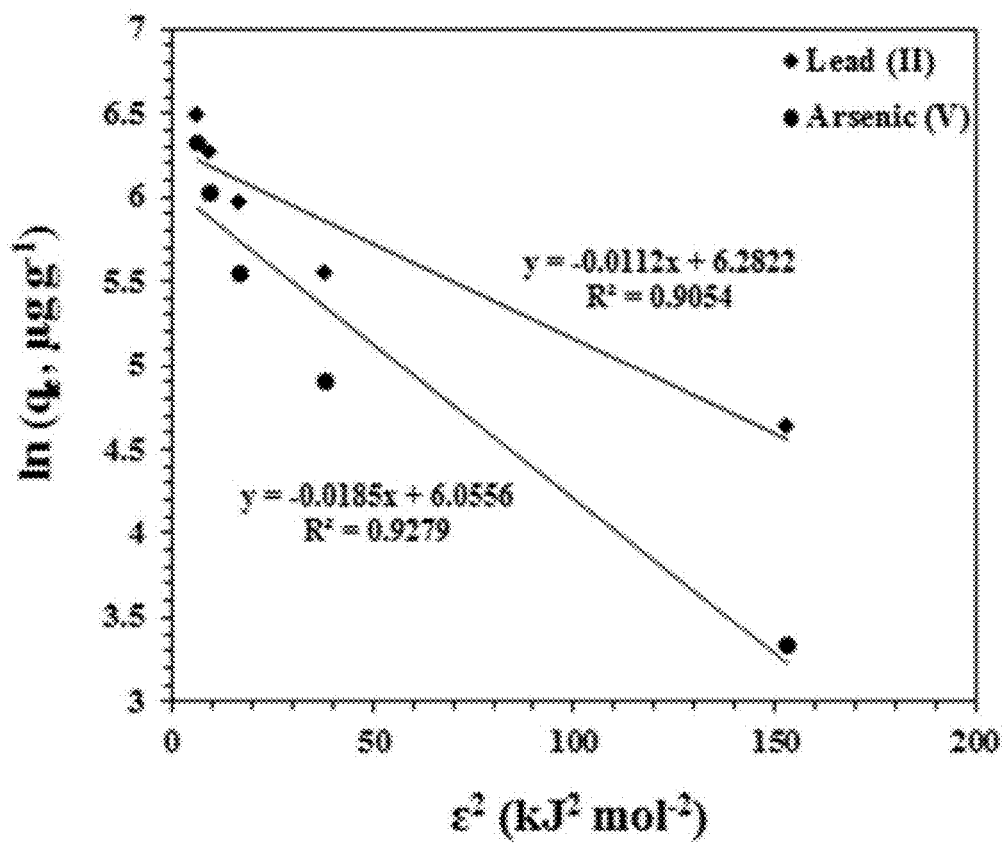
FIG. 11 is a Dubinin-Kaganer-Radushkevich (DKR) adsorption isotherm for lead (II) or arsenic (V) adsorption by a cross-linked polymeric resin of formula (I) wherein $R_1$ is —H and n is 4 (An-Buta) or n is 12 (An-Dodeca).

The DKR adsorption model is often utilized to explain the adsorption mechanism where it is considered to be more general than the Langmuir isotherm model as it doesn't consider homogeneous adsorption as a sole mechanism or constant adsorption [Y. Chen, M. He, C. Wang, Y. Wei, A novel polyvinyltetrazole-grafted resin with high capacity for adsorption of Pb(ii), Cu(ii) and Cr(iii) ions from aqueous solutions, Journal of Materials Chemistry A, 2 (2014) 10444-10453.—incorporated herein by reference in its entirety]. FIG. 11 shows the linearized plot of the DKR isotherm model. The linear form of the DKR isotherm model can be represented by formula (X).

$$\ln q_e = \ln q_m - \beta \varepsilon^2 \tag{X}:$$

In this formula, $q_m$ is the maximum absorption capacity (µg $g^{-1}$), ε is polany potential ($kJ^2$ $mol^{-2}$) and can be calculated in accordance with formula (XI), and β is a constant representing the energy of adsorption (mol² kJ⁻²). The average free energy (E) of adsorption can be calculated from β in accordance with formula (XII).

$$\varepsilon = RT\ln\left(1 + \frac{1}{C_e}\right) \quad \text{(XI)}$$

$$E = \frac{1}{\sqrt{2\beta}} \quad \text{(XII)}$$

The value of E, average free energy, is used to estimate the mode of the adsorption mechanism. An E value of 1-8 kJ mol⁻¹ represents physical adsorption, an E value of 8-16 represents electrostatic attraction, and an E value of greater than 16 represents chemical adsorption. Table 3 presents the E values calculated for the adsorption and found to be 6.682 μg g⁻¹ for lead (II) ion adsorption and 5.199 μg g⁻¹ for arsenic (V) ion adsorption. This indicates that the adsorption process may be physisorption [I. Mobasherpour, E. Salahi, M. Ebrahimi, Thermodynamics and kinetics of adsorption of Cu(II) from aqueous solutions onto multi-walled carbon nanotubes, Journal of Saudi Chemical Society, 18 (2014) 792-801; and D. M. Burke, M. A. Morris, J. D. Holmes, Chemical oxidation of mesoporous carbon foams for lead ion adsorption, Sep Purif Technol, 104 (2013) 150-159.; and S. Shen, L. Guishen, T. Pan, J. He, Z. Guo, Selective adsorption of Pt ions from chloride solutions obtained by leaching chlorinated spent automotive catalysts on ion exchange resin Diaion WA21J, Journal of Colloid and Interface Science, 364 (2011) 482-489.—each incorporated herein by reference in its entirety].

Example 7

Effect of Contact Time and Adsorption Kinetic Model Studies

Figure 12:
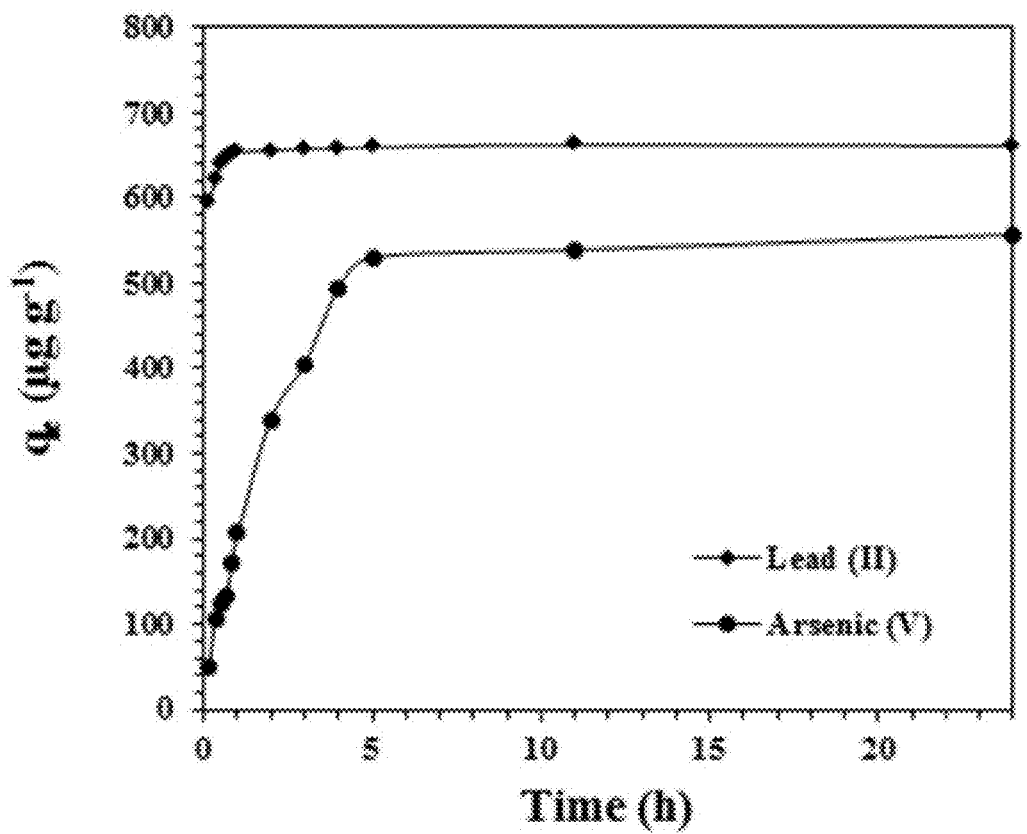
FIG. 12 is a plot illustrating the relationship between contact time of a cross-linked polymeric resin of formula (I) wherein $R_1$ is —H and n is 4 (An-Buta) or n is 12 (An-Dodeca) and lead (II) or arsenic (V) adsorption capacity.

The effect of contact time and temperature on the adsorption capacity was only examined in the cases of the An-Buta and An-Dodeca terpolymers as they were found to be the most efficient adsorbents in the removal of lead (II) and arsenic (V) ions. FIG. 12 shows that the adsorption capacity increased with increases in time. Notably, in terms of An-Buta adsorption of lead (II) ions the adsorption reached equilibrium within 1 hour; indicating efficient adsorption towards lead (II) ions by An-Buta, due to high electrostatic attraction between the high concentration of amino groups and the positive lead (II) ions. In contrast, An-Dodeca adsorption of arsenic (V) ions reached equilibrium within 5 hours, which may be attributed to the adsorption process wherein arsenic (V) ions diffuse through the pores of An-Dodeca. In order to further understand the adsorption mechanism, the experimental data were subjected to first-order, second-order, and intraparticle diffusion kinetic models.

The first-order model assumes that the absorption rate relates to the vacant adsorptive sites on the adsorbent, and the adsorption process is considered physisorption [P. Kampalanonwat, P. Supaphol, Preparation and adsorption behavior of aminated electrospun polyacrylonitrile nanofiber mats for heavy metal ion removal, ACS Appl. Mater. Interfaces, 2 (2010) 3619-3627.—incorporated herein by reference in its entirety]. The linear form of the first-order kinetic model can be represented by formula (XIII).

$$\log(q_e - q_t) = \log q_e - \frac{k_1 t}{2.303} \quad \text{(XIII)}$$

Figure 13:
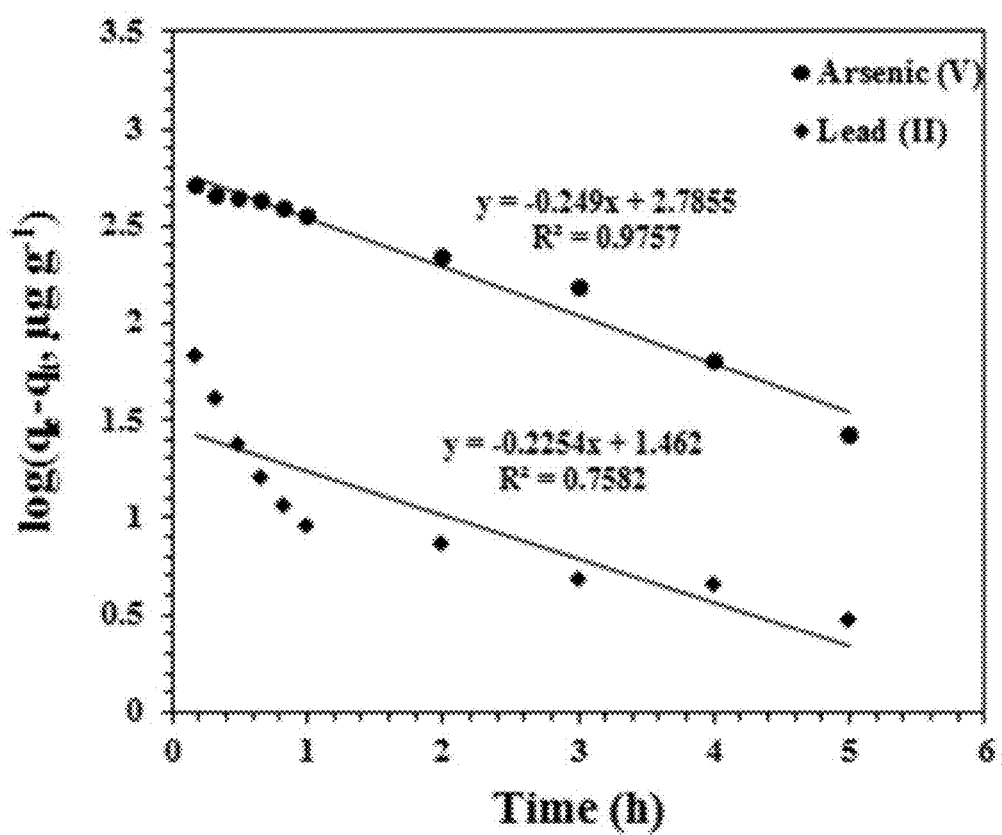
FIG. 13 is a first-order kinetic model plot for lead (II) or arsenic (V) adsorption by a cross-linked polymeric resin of formula (I) wherein $R_1$ is —H and n is 4 (An-Buta) or n is 12 (An-Dodeca).

In this equation, $q_t$ is the adsorption capacity at a certain time t (μg g⁻¹) and $k_1$ is the first-order rate constant (h⁻¹). From the slope and intercept of the plot of log ($q_e - q_t$) versus t, the calculated $q_e$ and $k_1$ can be obtained. FIG. 13 shows this linearized plot. Table 4 shows that the adsorption of lead (II) ions by An-Buta was poorly fitted to this kinetic model. In contrast, the adsorption of arsenic (V) ions by An-Dodeca was well fitted by the kinetic model where the adsorption capacity value is coherent with the experimental value, suggesting that the adsorption of arsenic (V) ions by An-Dodeca may be physisorption.

TABLE 4

First-order, second-order, and intraparticle diffusion kinetic models for the adsorption of lead (II) and arsenic (V) ions by An-Buta and An-Dodeca terpolymers

| | | First order kinetic model | | | |
|---|---|---|---|---|---|
| Polyamine | Metal | $q_{e,exp}$ (μg g⁻¹) | $q_{e,cal}$ (μg g⁻¹) | $k_1$ (h⁻¹) | $R^2$ |
| An-Buta | Lead (II) | 661 | 29 | 0.5191 | 0.7582 |
| An-Dodeca | Arsenic (V) | 557 | 610 | 0.5730 | 0.9757 |

| | | Second order kinetic model | | | |
|---|---|---|---|---|---|
| | | $q_{e,exp}$ (μg g⁻¹) | $q_{e,cal}$ (μg g⁻¹) | $k_1$ (g μg⁻¹h⁻¹) | $R^2$ |
| An-Buta | Lead (II) | 661 | 667 | 0.1124 | 1.000 |
| An-Dodeca | Arsenic (V) | 557 | 588 | 0.0011 | 0.9950 |

| | | Intraparticle diffusion model | | |
|---|---|---|---|---|
| | | x | $k_p$ | $R^2$ |
| An-Buta | Lead (II) | 552.02 | 114.17 | 0.9535 |
| An-Dodeca | Arsenic (V) | — | 228.37 | 0.9677 |

The second-order kinetic model is related to the difference between the equilibrium vacant adsorptive sites and the occupied sites and assumes that the adsorption process is considered to be chemisorption [H. K. Boparai, M. Joseph, D. M. O'Carroll, Kinetics and thermodynamics of cadmium ion removal by adsorption onto nano zerovalent iron particles, J. Hazard. Mater., 186 (2011) 458-465.—incorporated herein by reference in its entirety]. The linear form of the second-order kinetic model can be represented by formula (XIV).

$$\frac{t}{q_t} = \frac{1}{k_2 q_e^2} + \frac{1}{q_e} t \quad \text{(XIV)}$$

Figure 14:
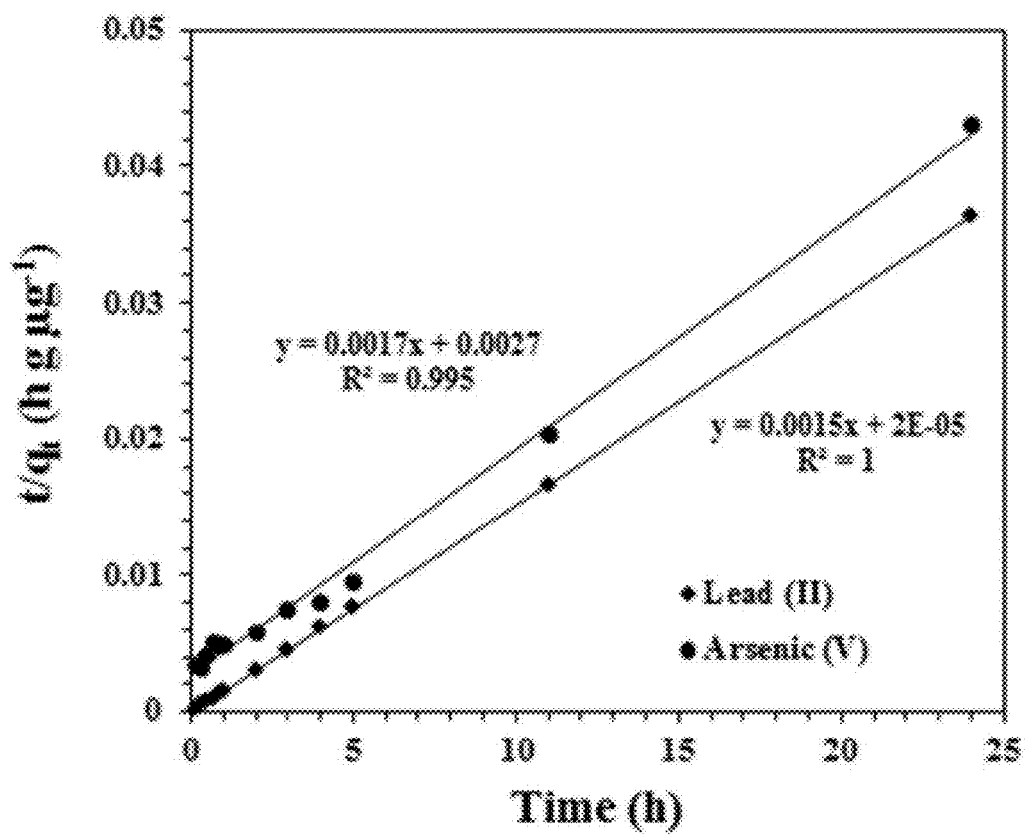
FIG. 14 is a second-order kinetic model plot for lead (II) or arsenic (V) adsorption by a cross-linked polymeric resin of formula (I) wherein $R_1$ is —H and n is 4 (An-Buta) or n is 12 (An-Dodeca).

In this formula, $k_2$ is the second order rate constant (g μg⁻¹ h⁻¹), $q_e$ and $q_t$ are the equilibrium adsorption capacity (μg g⁻¹) and adsorption capacity at time t (μg g⁻¹) respectively. Table 4 shows through the data that the experimental and calculated adsorption capacities are coherent with a good correlation coefficient ($R^2 > 0.99$). The calculated adsorption capacity ($q_e$) and the rate constant can be found from the slope and intercept of the linear plot of the linear plot of $t/q_t$ versus t. FIG. 14 shows this linear plot. The fitness of the data from this kinetic model suggests that the adsorption of lead (II) and arsenic (V) ions by An-Buta and An-Dodeca may be chemisorption. Through analysis of both kinetic models it can be seen that the experimental data fitted the second-order kinetic model more than the first-order kinetic model. However, in looking at the adsorption of arsenic by An-Dodeca, both models fit the adsorption process. Moreover, the $q_{e, cal}$ results show that both models are close to the $q_{e, exp}$ values.

The intraparticle diffusion model proposed by Weber and Morris was used to further investigate the mechanism of the adsorption process of lead (II) and arsenic (V) ions by An-Buta and An-Dodeca, respectively [E. I. Unuabonah, K. O. Adebowale, B. I. Olu-Owolabi, Kinetic and thermodynamic studies of the adsorption of lead (II) ions onto phosphate-modified kaolinite clay, J. Hazard. Mater., 144 (2007) 386-395.—incorporated herein by reference in its entirety]. The intraparticle diffusion model assumes that the adsorption process goes through three steps: i) film diffusion, where metal ions transfer from the bulk solution to the adsorbent through a liquid film, ii) intraparticle diffusion, where the metal ions diffuse through the pores of the adsorbent, and iii) mass action, where the adsorption of metal ions reaches equilibrium, which is considered to be negligible. The intraparticle diffusion model was used in order to determine whether the rate determining step in the adsorption process is controlled by film diffusion or intraparticle diffusion. The linear form of the intraparticle diffusion model can be express by formula (XV).

$$q_t = k_p t^{0.5} + x \quad (XV)$$

Figure 15:
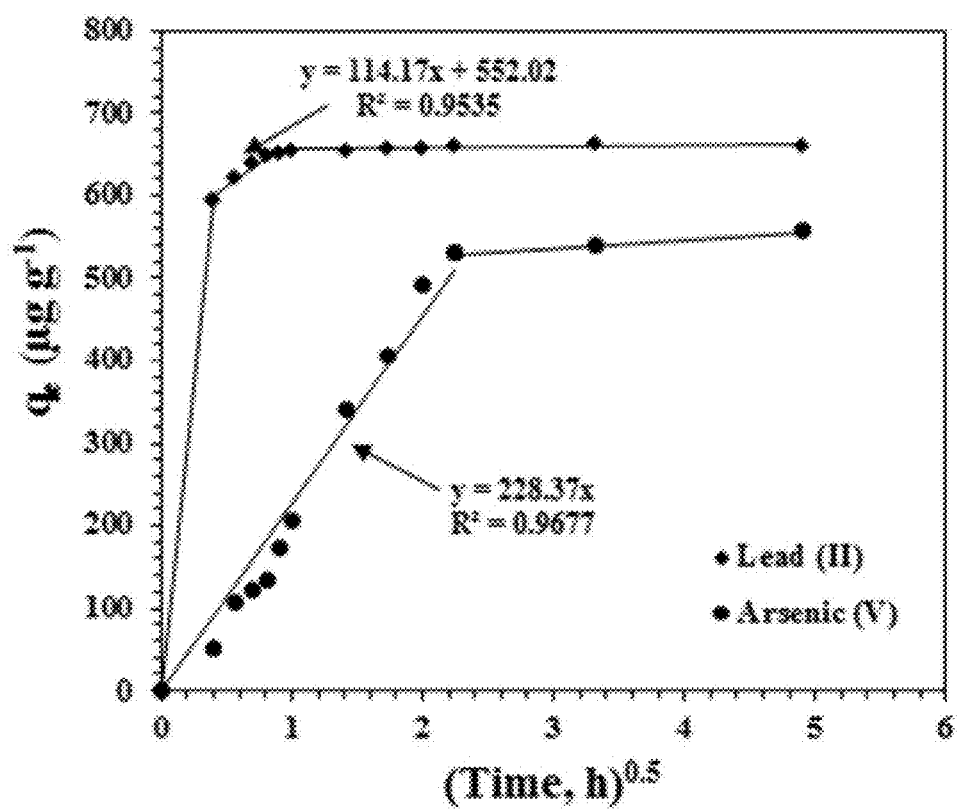
FIG. 15 is an intraparticle diffusion model plot for lead (II) or arsenic (V) adsorption by a cross-linked polymeric resin of formula (I) wherein $R_1$ is —H and n is 4 (An-Buta) or n is 12 (An-Dodeca).

In this formula, $k_p$ is the rate constant in the intraparticle diffusion model and x is a constant related to boundary layer thickness. In order for the process to be totally controlled by intraparticle diffusion, a plot of $q_t$ versus $t^{0.5}$ must pass through the origin. FIG. 15 shows this plot and that the adsorption plot of lead (II) ions by An-Buta possesses three linear steps: i) rapid adsorption that represents film diffusion, ii) slow gradual increase in the adsorption capacity that is considered intraparticle diffusion, and iii) reaching equilibrium. In contrast, the adsorption of arsenic (V) ions by An-Dodeca was controlled by intraparticle diffusion, as can be seen by two linear steps: i) intraparticle diffusion and ii) the adsorption reaching equilibrium.

Example 8

Thermodynamic Studies

The thermodynamic parameter ΔG° (standard free energy), ΔH° (enthalpy change), and ΔS° (entropy change) were calculated to determine the nature of the adsorption, using the linear Van't Hoff equation as express by formula (XVI).

$$\ln K_c = \frac{\Delta S^\circ}{R} - \frac{\Delta H^\circ}{RT} \quad (XVI)$$

Figure 16:
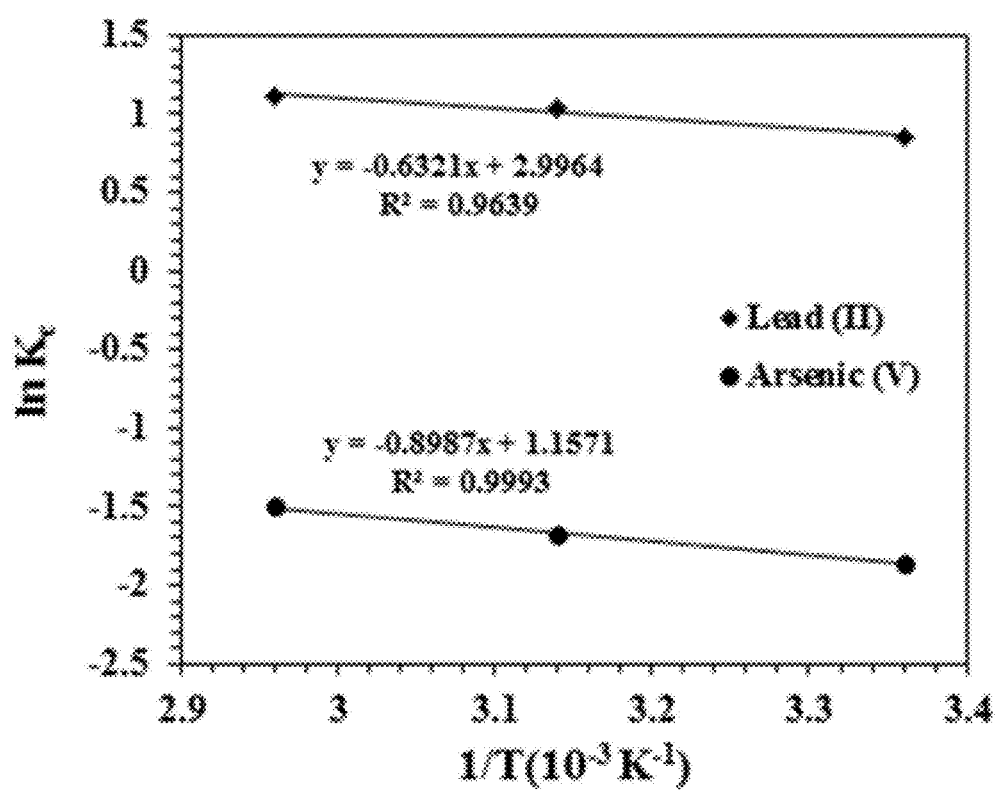
FIG. 16 is a Van't-Hoff plot for calculating thermodynamic parameters of lead (II) or arsenic (V) adsorption by a cross-linked polymeric resin of formula (I) wherein $R_1$ is —H and n is 4 (An-Buta) or n is 12 (An-Dodeca).

In this formula, R is the gas constant of 8.314 J/mol·K, T is the absolution temperature in kelvin (K), and $K_c = q_e/C_e$ (L/mg) and is the standard thermodynamic equilibrium constant. FIG. 16 presents the linear plot of the Van't Hoff equation. Table 5 presents the calculated thermodynamic parameters. The decrease in ΔG° value with increasing temperature indicates that adsorption of the ion on the adsorbent becomes favorable at higher temperatures. The positive values of standard enthalpy change ΔH° suggest that the adsorption is endothermic. The positive standard entropy change ΔS° reflects the affinity of the resin towards the metals.

TABLE 5

Thermodynamic parameters for the adsorption of lead (II) and arsenic (V) ions by An-Buta and An-Dodeca terpolymers

| Metal ion | Temperature (K) | ΔG° (kJ/mol) | ΔH° (kJ/mol) | ΔS° (J/mol · K) |
|---|---|---|---|---|
| Lead (II) | 298 | −7.43 | 5.29 | 24.94 |
|  | 318 | −7.92 |  |  |
|  | 338 | −8.43 |  |  |
| Arsenic (V) | 298 | −2.71 | 7.31 | 9.14 |
|  | 318 | −2.90 |  |  |
|  | 338 | −3.08 |  |  |

Example 9

Figure 17:
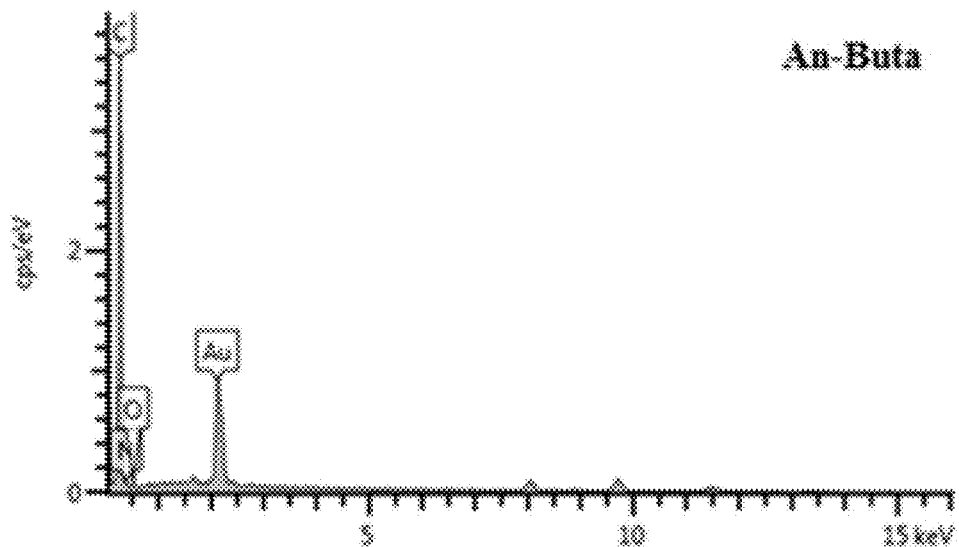
FIG. 17 is a scanning electron microscopy-energy dispersive X-ray spectroscopy (SEM-EDX) elemental analysis of a cross-linked polymeric resin of formula (I) wherein $R_1$ is —H and n is 4 (An-Buta).
Figure 18:
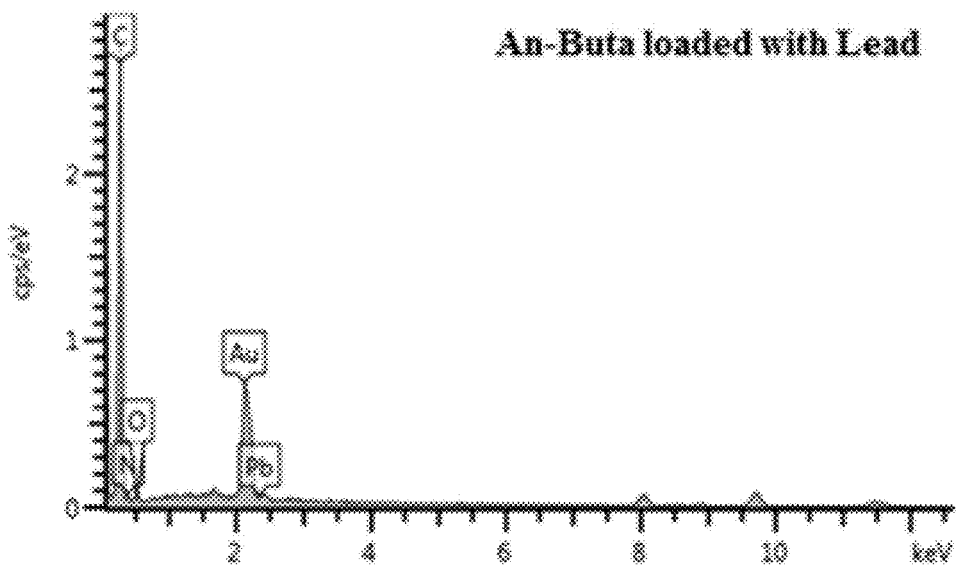
FIG. 18 is a SEM-EDX elemental analysis of a cross-linked polymeric resin of formula (I) wherein $R_1$ is —H and n is 4 (An-Buta) after loading with lead (II).
Figure 19:
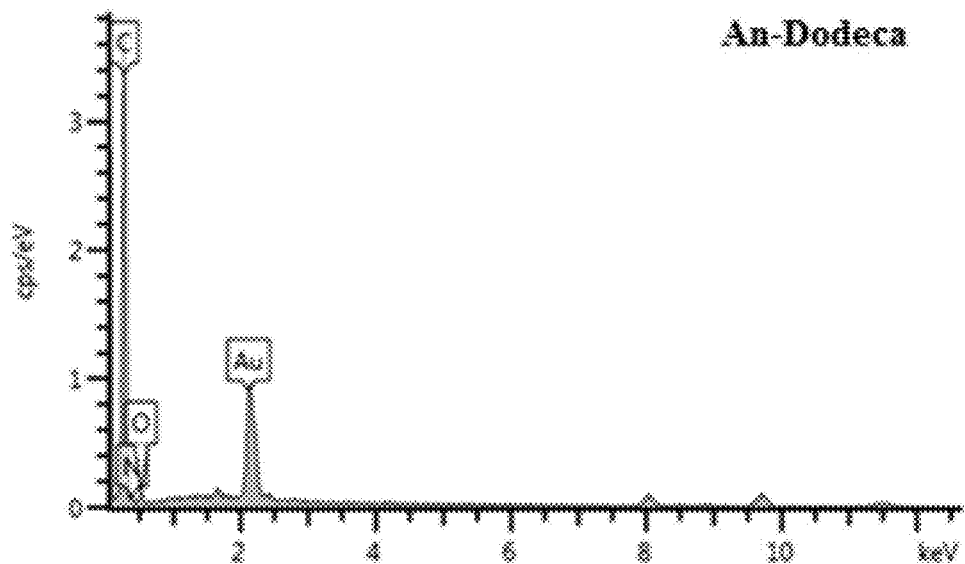
FIG. 19 is a SEM-EDX elemental analysis of a cross-linked polymeric resin of formula (I) wherein $R_1$ is —H and n is 12 (An-Dodeca).
Figure 20:
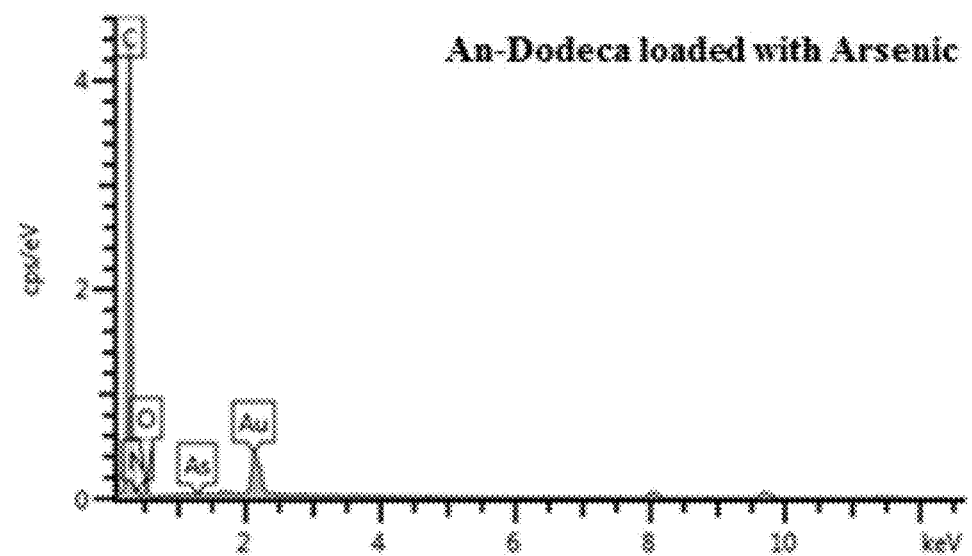
FIG. 20 is a SEM-EDX elemental analysis of a cross-linked polymeric resin of formula (I) wherein $R_1$ is —H and n is 12 (An-Dodeca) after loading with arsenic (V).
Figure 21:
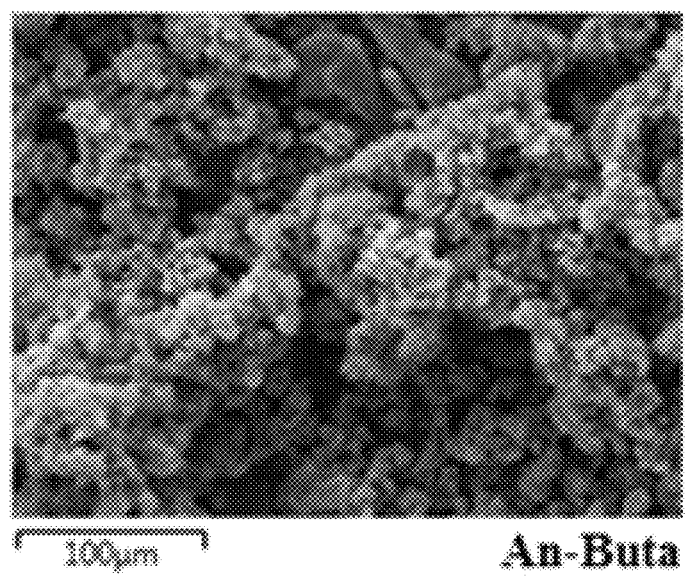
FIG. 21 is a SEM-EDX micrograph image of a cross-linked polymeric resin of formula (I) wherein $R_1$ is —H and n is 4 (An-Buta).
Figure 22:
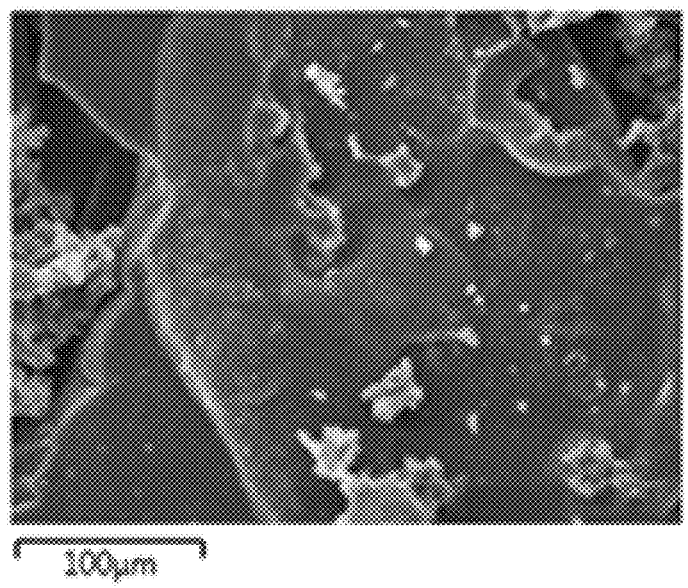
FIG. 22 is a SEM-EDX micrograph image of a cross-linked polymeric resin of formula (I) wherein $R_1$ is —H and n is 4 (An-Buta) after loading with lead (II).
Figure 23:
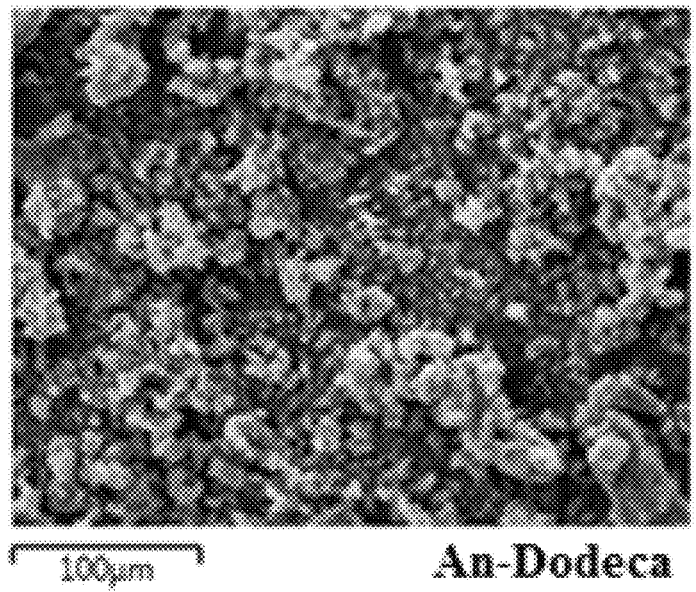
FIG. 23 is a SEM-EDX micrograph image of a cross-linked polymeric resin of formula (I) wherein $R_1$ is —H and n is 12 (An-Dodeca).
Figure 24:
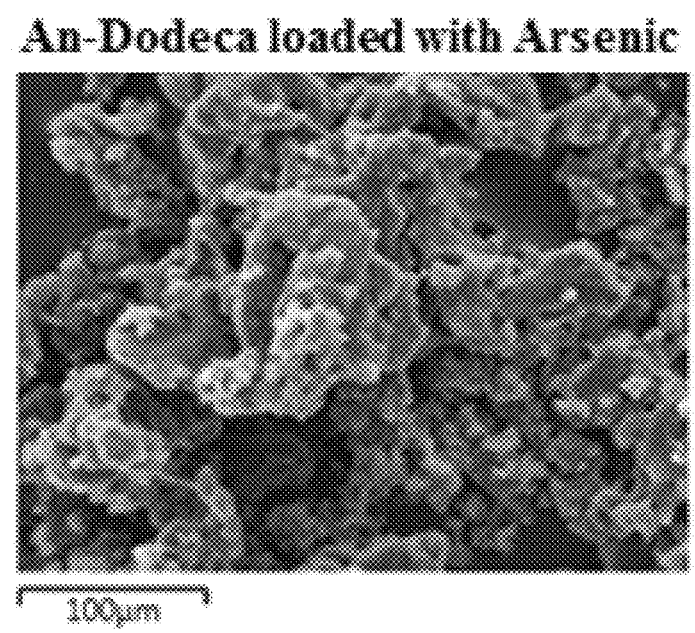
FIG. 24 is a SEM-EDX micrograph image of a cross-linked polymeric resin of formula (I) wherein $R_1$ is —H and n is 12 (An-Dodeca) after loading with arsenic (V).

Scanning Electron Microscopy-Energy Dispersive X-Ray Spectroscopy (SEM-EDX) Characterization of the Loaded and Unloaded Prepared An-Buta and An-Dodeca Terpolymers An-Buta and An-Dodeca were characterized using scanning electron microscopy-energy dispersive X-ray spectroscopy SEM-EDX. Both polyamines were scanned before and after adsorption with lead (II) and arsenic (V), respectively. Unloaded An-Buta and An-Dodeca were immersed in 1 mg $L^{-1}$ solutions of lead (II) and arsenic (V) ions and stirred overnight, then filtered and dried at 60° C. under vacuum until a constant weight was achieved. The loaded and unloaded polyamines were then sputter coated with a thin film of gold. The adsorption of lead and arsenic was confirmed by the EDX analysis. FIG. 17 is the EDX spectra of the unloaded An-Buta terpolymer. FIG. 18 is the EDX spectra of the An-Buta terpolymer after adsorption of lead (II) ions. FIG. 19 is the EDX spectra of the unloaded An-Dodeca terpolymer. FIG. 20 is the EDX spectra of the An-Dodeca terpolymer after adsorption of arsenic (V) ions. FIG. 21 is a SEM image of the unloaded An-Buta terpolymer. FIG. 22 is a SEM image of the An-Buta terpolymer after adsorption of lead (II) ions. FIG. 23 is a SEM image of the unloaded An-Dodeca terpolymer. FIG. 24 is a SEM image of the An-Dodeca terpolymer after adsorption of arsenic (V) ions. The surface morphology of the polyamines changed from a rough surface to a relatively smooth surface follow adsorption. The loaded An-Buta terpolymer showed relatively more smoothness after adsorption which may be attributed to the higher loading of lead ions compared to arsenic loading on the An-Dodeca terpolymer.

Example 10

Treatment of Wastewater Samples

The treatments of real wastewater samples were performed by immersing 0.03 g of An-Buta and An-Dodeca in 20 mL of spiked (with 1 mg $L^{-1}$ of lead (II) ions and 1 mg $L^{-1}$ of arsenic (V) ions, respectively) and unspiked wastewater and left to stir for 24 hours at room temperature. The most important factor in synthesizing new adsorbents is their application to real wastewater samples. In the present disclosure two wastewater samples (unspiked and spiked with 1 mg $L^{-1}$ of lead (II) ions and 1 mg $L^{-1}$ of arsenic (V) ions) were utilized to test the efficacy of An-Buta and An-Dodeca in the removal of toxic metal ions. Table 6 summarizes the results of treatment with An-Buta and An-Dodeca for the unspiked wastewater sample. Table 7 summarizes the results of treatment with An-Buta and An-Dodeca for the spiked (with 1 mg $L^{-1}$ of lead (II) ions and 1 mg $L^{-1}$ of arsenic (V)

ions, respectively) wastewater samples. The An-Buta terpolymer showed high efficacy and selectivity in the removal of lead (II) ions from the wastewater samples with a percentage removal (%) of 97.5%. In contrast, the An-Dodeca terpolymer showed no selectivity towards arsenic ions; however, it showed selectivity towards copper, zinc, and cadmium ions, which may be attributed to the competition between the different metal ions in the wastewater, where small metal ions such as copper (~98% removal) and zinc (~89% removal) diffuse faster into the pores of An-Dodeca preventing the adsorption of arsenic ions. The results shown in Table 6 and Table 7 demonstrate that both polyamines have high potential to be used as adsorbents for the treatment of aqueous samples and wastewater solutions.

TABLE 6

Comparison of metals concentration before and after treatment with An-Buta and An-Dodec in two wastewater samples obtained from a water treatment plant (Dhahran, Saudi Arabia)

| Polyamine | Metal | Original Sample (µg L$^{-1}$) | After Treatment (µg L$^{-1}$) | Percentage removal (%) |
|---|---|---|---|---|
| An-Buta | Co | 0.837 ± 0.06 | 0.45 ± 0.096 | 46.24 |
| | Cu | 178.8 ± 99.7 | 42.17 ± 0.685 | 76.41 |
| | Zn | 548.7 ± 60.04 | 7.963 ± 9.63 | 98.55 |
| | As | 5.201 ± 0.94 | 4.144 ± 0.67 | 20.32 |
| | Sr | 4994.0 ± 253.9 | 3934 ± 61.30 | 21.23 |
| | Mo | 11.45 ± 0.467 | 11.6 ± 0.18 | — |
| | Cd | 0.496 ± 0.021 | < MDL | — |
| | Pb | < MDL | < MDL | — |
| An-Dodeca | Co | 0.837 ± 0.06 | 0.867 ± 0.06 | — |
| | Cu | 178.8 ± 99.7 | 39.49 ± 99.7 | 77.91 |
| | Zn | 548.7 ± 60.04 | 48.3 ± 60.4 | 91.20 |
| | As | 5.201 ± 0.94 | 6.905 ± 0.94 | — |
| | Sr | 4994.0 ± 253.9 | 4846 ± 253.9 | 2.96 |
| | Mo | 11.45 ± 0.467 | 11.49 ± 0.467 | — |
| | Cd | 0.496 ± 0.021 | < MDL | — |
| | Pb | < MDL | < MDL | — |

Mean and standard deviation of triplicates (n = 3). Values of (±) are the minimum detection limit (MDL), 3σ of a blank sample.

TABLE 7

Comparison of metals concentration before and after treatment with An-Buta and An-Dodec in two spiked (with 1 mg L$^{-1}$ of lead (II) ions and 1 mg L$^{-1}$ of arsenic (V) ions) wastewater samples obtained from a water treatment plant (Dhahran, Saudi Arabia)

| Polyamine | Metal | Original Sample (µg L$^{-1}$) | After Treatment (µg L$^{-1}$) | Percentage removal (%) |
|---|---|---|---|---|
| An-Buta | Co | 0.729 ± 0.06 | 0.729 ± 0.06 | — |
| | Cu | 1308.0 ± 99.7 | 63.62 ± 99.7 | 95.14 |
| | Zn | 854.7 ± 60.04 | 27.59 ± 60.04 | 96.77 |
| | As | 5.201 ± 0.94 | 4.022 ± 0.94 | 22.67 |
| | Sr | 5348.0 ± 253.9 | 4167.0 ± 253.9 | 22.08 |
| | Mo | 4.249 ± 0.467 | 4.249 ± 0.467 | — |
| | Cd | 0.496 ± 0.021 | 0.094 ± 0.021 | 81.05 |
| | Pb (spiked) | 1052.0 ± 65.7 | 26.5 ± 65.7 | 97.48 |
| An-Dodeca | Co | 0.729 ± 0.06 | 0.82 ± 0.06 | — |
| | Cu | 1308.0 ± 99.7 | 31.28 ± 99.7 | 97.61 |
| | Zn | 854.7 ± 60.04 | 91.2 ± 60.04 | 89.33 |
| | As (spiked) | 1305 ± 0.94 | 1114 ± 0.94 | 14.64 |
| | Sr | 5348.0 ± 253.9 | 4634 ± 253.9 | 13.35 |
| | Mo | 4.249 ± 0.467 | 11.32 ± 0.467 | — |
| | Cd | 0.496 ± 0.021 | 0.01 ± 0.021 | 97.98 |
| | Pb | 28.5 ± 1.2 | < MDL | — |

Mean and standard deviation of triplicates (n = 3). Values of (±) are the minimum detection limit (MDL), 3σ of a blank sample.

A new series of polyamines has been synthesized via Mannich polycondensation reaction and characterized by various spectroscopic techniques. Two of the synthesized polyamines (An-Buta and An-Dodeca) showed high potential in the removal of lead (II) and arsenic (V) ions from aqueous solutions. Upon application to real wastewater samples An-Buta showed high selectivity and efficacy in the removal of lead (II) ions (~98% removal). In contrast, An-Dodeca showed high potential in the removal of arsenic (V) ions from aqueous solution (85% removal) and little to no selectivity in wastewater samples largely due to competition with other metal ions (copper~98% removal and zinc~89% removal). The synthesized polyamines show high potential for applications as new industrial adsorbents for wastewater treatment.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A cross-linked polymeric resin of formula (I)

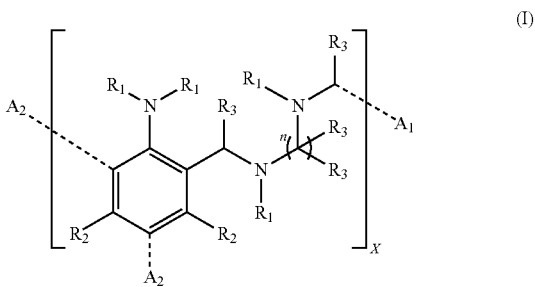

or a salt, solvate, tautomer or stereoisomer derived from the cross-linked polymeric resin of formula (I);
wherein, each $R_1$ is independently selected from —H, an alkyl, a cycloalkyl, and an optionally aryl;
each $R_3$ is independently selected from —H, —F, —Cl, —Br, —CN, —OR$_3$, an alkyl, a cycloalkyl, and an aryl;
each $R_3$ is independently selected from —H, an alkyl, a cycloalkyl, and an aryl;
n is a positive whole number in the range of 2-16;
X is a positive whole number; and
$A_1$ forms a bond to $A_2$ of another monomer unit.

2. The cross-linked polymeric resin of claim 1, wherein each $R_1$ is —H.

3. The cross-linked polymeric resin of claim 1, wherein the cross-linked polymeric resin of formula (I) is

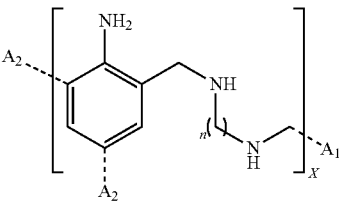

or a salt or solvate derived therefrom;
wherein, n is a positive whole number in the range of 4-12;
X is a positive whole number; and
$A_1$ forms a bond to $A_2$ of another monomer unit.

4. The cross-linked polymeric resin of claim 1, which is in the form of a pulverulent powder having a BET surface area in the range of 2.0 to 15.0 $m^2$ $g^{-1}$.

* * * * *